US012010004B2

(12) United States Patent
Gao et al.

(10) Patent No.: US 12,010,004 B2
(45) Date of Patent: Jun. 11, 2024

(54) NETWORK MANAGEMENT WITH TOPOLOGY DEPENDENCY AND PATH GENERATION

(71) Applicant: NetBrain Technologies, Inc., Burlington, MA (US)

(72) Inventors: Lingping Gao, Burlington, MA (US); Guangdong Liao, Burlington, MA (US); Feng Gan, Burlington, MA (US); Yanguo Guo, Burlington, MA (US); Xinfeng Xia, Burlington, MA (US); Dezhi Chen, Burlington, MS (US); Nong Jiang, Burlington, MA (US)

(73) Assignee: NetBrain Technologies, Inc., Burlington, MA (US)

( * ) Notice: Subject to any disclaimer, the term of this patent is extended or adjusted under 35 U.S.C. 154(b) by 0 days.

(21) Appl. No.: 16/517,078

(22) Filed: Jul. 19, 2019

(65) Prior Publication Data
US 2021/0021492 A1    Jan. 21, 2021

(51) Int. Cl.
*H04L 43/045* (2022.01)
*H04L 12/46* (2006.01)
*H04L 41/12* (2022.01)
*H04L 41/14* (2022.01)

(52) U.S. Cl.
CPC ........ *H04L 43/045* (2013.01); *H04L 12/4641* (2013.01); *H04L 41/12* (2013.01); *H04L 41/14* (2013.01)

(58) Field of Classification Search
None
See application file for complete search history.

(56) References Cited

U.S. PATENT DOCUMENTS

| | | | | |
|---|---|---|---|---|
| 8,386,593 | B1 * | 2/2013 | Gao | H04L 41/22 709/224 |
| 9,374,278 | B2 * | 6/2016 | Gao | H04L 41/085 |
| 9,438,481 | B2 * | 9/2016 | Gao | H04L 41/22 |
| 2006/0020694 | A1 * | 1/2006 | Nag | H04L 41/22 715/700 |
| 2009/0157630 | A1 * | 6/2009 | Yuan | G06F 16/951 715/810 |
| 2010/0138750 | A1 | 6/2010 | Trinler | |
| 2012/0314605 | A1 * | 12/2012 | Akiyoshi | H04L 49/253 370/255 |
| 2014/0192645 | A1 * | 7/2014 | Zhang | H04L 45/302 370/235 |
| 2014/0269266 | A1 * | 9/2014 | Filsfils | H04L 45/22 370/228 |

(Continued)

FOREIGN PATENT DOCUMENTS

| | | |
|---|---|---|
| EP | 1 349 318 A2 | 10/2003 |
| EP | 3 324 575 A1 | 5/2018 |

OTHER PUBLICATIONS

Extended European Search Report for EP Application No. EP 20 18 6452 dated Mar. 12, 2021 (12 pages).

*Primary Examiner* — Dhairya A Patel
(74) *Attorney, Agent, or Firm* — Crowell & Moring LLP

(57) ABSTRACT

A system manages a network using a graphical user interface (GUI) that maps the network. The mapping includes a topology of network layers and includes the generation of a path through the network, which may use virtualization technology. The path may be an AB network path that is automatically discovered and may be compared with a golden path.

20 Claims, 25 Drawing Sheets

(56) References Cited

U.S. PATENT DOCUMENTS

| | | | |
|---|---|---|---|
| 2014/0280864 A1* | 9/2014 | Yin | H04L 41/122 |
| | | | 709/224 |
| 2014/0355450 A1* | 12/2014 | Bhikkaji | H04L 45/24 |
| | | | 370/237 |
| 2015/0081887 A1* | 3/2015 | Kalkunte | H04L 43/0852 |
| | | | 709/224 |
| 2015/0103672 A1* | 4/2015 | Stuart | H04L 45/02 |
| | | | 370/389 |
| 2015/0156077 A1* | 6/2015 | Gao | H04L 41/0853 |
| | | | 709/223 |
| 2016/0119219 A1* | 4/2016 | Fang | H04L 41/122 |
| | | | 370/392 |
| 2017/0070426 A1* | 3/2017 | Chen | H04L 45/50 |
| 2017/0353490 A1* | 12/2017 | Krauss | H04L 63/1491 |
| 2018/0062956 A1* | 3/2018 | Schultz | H04L 41/0806 |
| 2018/0091419 A1* | 3/2018 | Bickhart | H04L 45/7452 |
| 2018/0115469 A1 | 4/2018 | Erickson et al. | |
| 2018/0262594 A1 | 9/2018 | Nhu et al. | |
| 2019/0044790 A1* | 2/2019 | Dickens | H04L 41/069 |
| 2019/0215248 A1* | 7/2019 | D'Ippolito | H04Q 11/0067 |
| 2021/0144082 A1* | 5/2021 | Bisht | H04L 41/12 |
| 2021/0304098 A1* | 9/2021 | Yang | G01C 21/343 |
| 2021/0309124 A1* | 10/2021 | Fields | B60N 2/4214 |
| 2022/0106060 A1* | 4/2022 | Morrison | H01M 8/04604 |
| 2022/0120574 A1* | 4/2022 | Simpson | G06F 16/9537 |

* cited by examiner

NETWORK MANAGEMENT WITH TOPOLOGY DEPENDENCY AND PATH GENERATION

BACKGROUND

In the modern computer age, businesses rely on an electronic network to function properly. Computer network management and troubleshooting is complex. There are thousands of shell scripts and applications for different network problems. The available, but poorly documented solutions, can be overwhelming for junior network engineers. Most network engineers learn troubleshooting through reading the manufacture's manual or internal documentation from the company's documentation department. But the effectiveness varies. For instance, the troubleshooting knowledge captured in a document can only be helpful if the information is accurate and if the user correctly identifies the problem. Many companies have to conduct extensive training for junior engineers. The conventional way for network troubleshooting requires a network professional to manually run a set of standard commands and processes for each of the devices. However, to become familiar with those commands, along with each of its parameters takes years of practice. Also complicated troubleshooting methodology is often hard to share and transfer. Therefore even though a similar network problem happens again and again, each instance of troubleshooting may still have to start from scratch. However, networks are getting more and more complex and it is increasingly difficult to manage it efficiently with traditional methods and tools.

Networks are getting more and more complex but network engineers still depend on the traditional methods and tools, such as the text-based command-line interface (CLI), to manage their networks. To troubleshoot a network problem or to simply verify if a network functions, a network engineer still needs to manually log in to each of the network devices and issue a CLI command to gather the data, manually parse and analyze each of the output for key data, and manually eliminate each of the possible problem causes. With text-based CLI as the primary method for troubleshooting a network problem, a network professional usually needs to repetitively execute the same CLI commands and decode key data from the command output many times for many network devices. This process can be error-prone, strenuous and time consuming.

To further complicate this already tangled process, many vendors and models of network hardware devices that exist in today's network, are providing different sets of CLI commands which output many different formats of data information. It is difficult, if not impossible, for a network engineer to simplify this process by writing a simple executable program to retrieve, parse and analyze the output data of each of these different devices. It is even more challenging to require a network engineer to master a programming language in a short time, and apply such skills in a reliable manner. For managed service providers (MSP), improving the efficiency of their troubleshooting processes means reduced training cost and increased reliability in providing services to their customers.

SUMMARY

This disclosure relates generally to network management and a graphical user interface (GUI) for mapping a network. Specifically, the mapping includes a topology of network layers and the generation of a path through the network, which may use virtualization technology. The path may be an AB network path that is automatically discovered and may be compared with a golden path. An AB network path may be a path in a network between end point A and end point B.

In one embodiment, there is a method for network management comprising generating a map displaying network devices, calculating paths between the devices, including both an underlay path and an overlay path, providing an interface for selecting path types for each of the network devices, and displaying one of the paths based on the selection of the path types at each of the network devices. The network being managed includes an overlay deployment. The overlay deployment includes a virtual layer acting as an overlay. The displayed one of the paths corresponds with the selected path type at each of the network devices. Each of the path types for each of the network devices is selectable. The selection of different ones of the path types displays different paths. The selectable path types are displayed on a path result pane adjacent to the mapping. The method further includes defining one or more applications, associating at least some of the paths with the defined one or more applications, receiving a selection of one of the one or more applications, and displaying the path associated with the selected application. The associating includes identifying which paths that data travels for the defined application. The method further includes recording topology dependency between different paths. The method further includes calculating a golden path for traffic, and monitoring changes of actual traffic as compared with the golden path.

In another embodiment, a method for network management includes determining a golden path for traffic flow through a network, monitoring traffic through the network, detecting changes of the traffic as compared with the golden path, updating the golden path as traffic is monitored, and displaying one or more paths on map. The golden path is displayed on the map. The one or more paths include both an underlay path and an overlay path. The updating the golden path requires a number of benchmark paths to be successful. The number of benchmark paths is set by the user.

In another embodiment, a graphical user interface includes a map displaying network devices and paths between each of the network devices, wherein the paths include both an underlay path and an overlay path. The GUI includes a path result pane displaying the network devices and selectable path types, wherein selection of one of the path types results in a display of paths from that path type. The GUI includes an application manager for defining an application and associating paths in which data travels for the defined application. A network displayed on the map includes an overlay deployment. One of the paths comprises a golden path that is automatically updated. Upon selection of an application from the application manager, the map displays one or more paths associated with that application.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 10 is an example screenshot of managing application with an application manager.

FIG. 13 is an example screenshot for importing a batch of application/path definitions with an application manager.

FIG. 16 is an example flowchart of logic for automatically setting the golden path.

Figure 19:
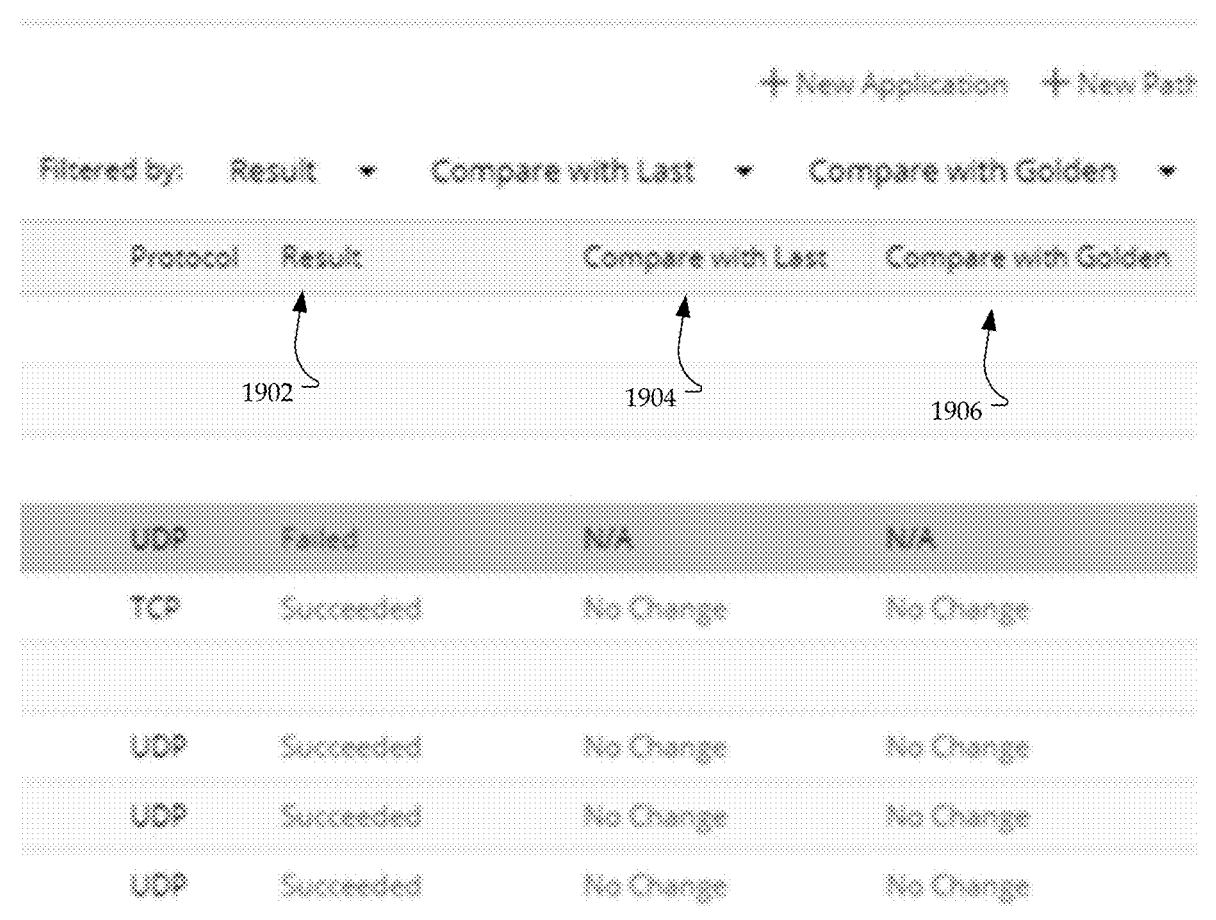

FIG. 19 is an example screenshot showing latest results for the application manager.

DETAILED DESCRIPTION

Figure 1:
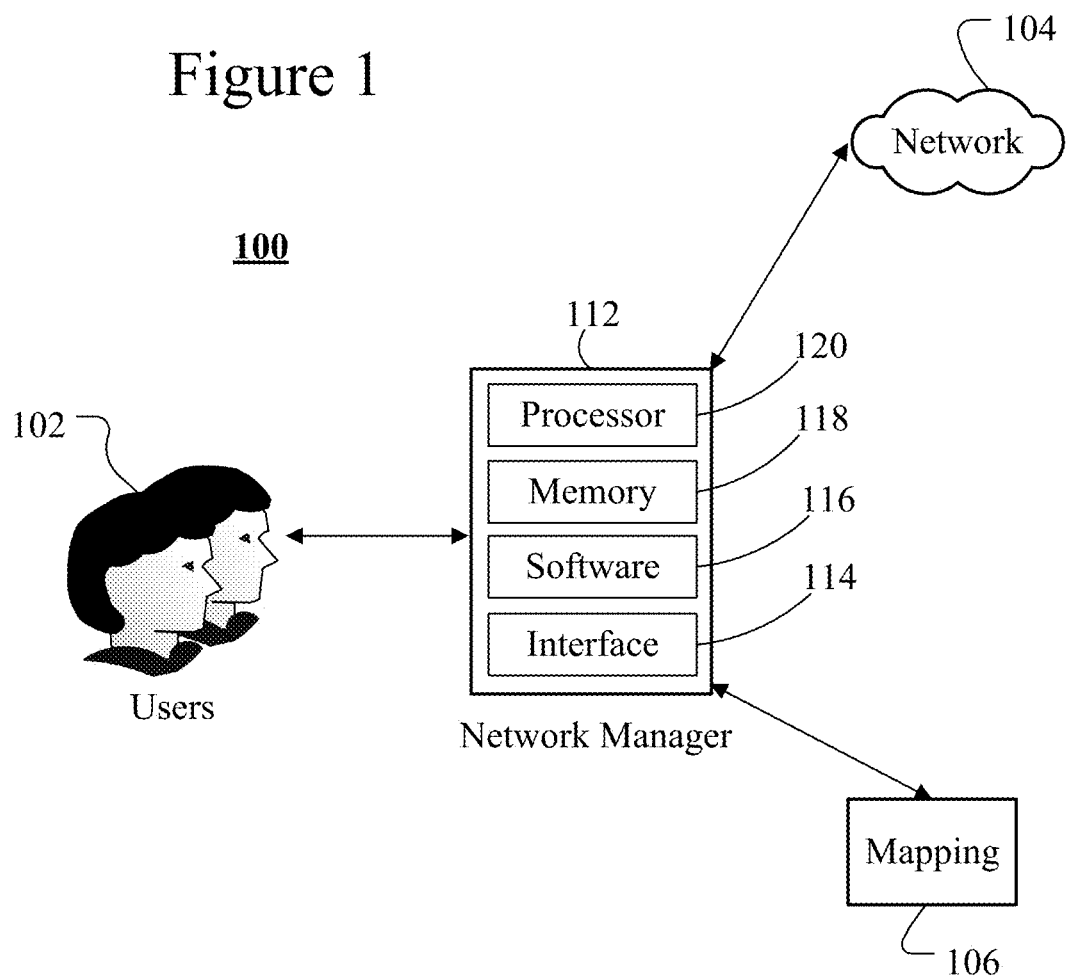
FIG. 1 illustrates a block diagram of an example network system.

By way of introduction, the disclosed embodiments relate to systems and methods for network management using a graphical user interface (GUI) that maps the network. The mapping includes a topology of network layers and includes the generation of a path through the network, which may use virtualization technology. The path may be an AB network path that is automatically discovered and may be compared with a golden path. The GUI provides management functionality based on a mapping of devices on the network. The management functionality may include troubleshooting a network problem and providing a GUI for standardizing computer network troubleshooting steps for reuse and knowledge transfer.

In a GUI-based system, a network structure may be represented with graphic features (icons, lines and menus) that represent corresponding features in a physical network in a map. The map may be a zoomable geographic mapping with multi-layers of representation of granularity, linked both by logic and by physical relationships. Such visual representation liberates a network engineer from memorizing the standard or proprietary protocols and the tedious manual tasks of typing and they can not only visually observe a computer network on a computer screen, but also can directly and intuitively interact (similar to a geographic map system) with the network to the smallest detail of a device as well as to the highest level of grand network design. The map system or mapping may be referred to as a "Qmap" and is further described with respect to U.S. Pat. Nos. 8,386,593, 8,325,720, and 8,386,937, the entire disclosure of each of which is hereby incorporated by reference.

GUIs are provided for users to write executable procedures without having any programming background. After a procedure is created, it can be run in connection with any network system. Troubleshooting with a proposed solution may just take a few minutes instead of hours or days traditionally. The troubleshooting and network management automation may be with the mapping of the network along with the NETBRAIN QAPP (Qapp) system. The Qapp system is further described with respect to U.S. Pat. Nos. 9,374,278, 9,438,481, U.S. Pat. Pub. No. 2015/0156077, U.S. Pat. Pub. No. 2016/0359687, and U.S. Pat. Pub. No. 2016/0359688, the entire disclosure of each of which is hereby incorporated by reference. GUIs, such as for troubleshooting, are further described in U.S. Ser. No. 16/374,374, filed Apr. 3, 2019, entitled "SYSTEM FOR CREATING NETWORK TROUBLESHOOTING PROCEDURE," the entire disclosure of which is hereby incorporated by reference.

The GUI system may access and display computer network data dynamically, including routing paths. Network routing is the process of selecting paths in a network along which to send traffic, such as data packets in an IP network. Previously, routing may have been performed manually, by constructing routing tables prior to applying traffic to the network. Dynamic routing constructs routing tables automatically according to a routing protocol. As described herein, the path generation is dynamically generated and displayed on a map. Examples of dynamic routing protocols include: Border Gateway Protocol (BGP), OSPF (Open Shortest Path First), RIP (Routing Information Protocol) and EIGRP (Enhanced Interior Gateway Routing Protocol) and others. Known routing algorithms include Distance Vector and Link-state. Different routing protocol may use different routing algorithms. For example the Link-state protocol Open Shortest Path First (OSPF) uses Dijkstra's algorithm to calculate the shortest path tree inside each network area.

Reference will now be made in detail to exemplary embodiments of the invention, examples of which are illustrated in the accompanying drawings. When appropriate, the same reference numbers are used throughout the drawings to refer to the same or like parts. The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

The particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user," "network engineer," "network manager," "network developer" and "participant" shall interchangeably refer to any person, entity, organization, machine, hardware, software, or business that accesses and uses the system of the disclosure. Participants in the system may interact with one another either online or off-line.

Communication between participants in the system of the present disclosure is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

A tool for understanding network behavior is through graphic visualization of the interactions between network devices. A computer-aided network engineering system with a network mapping and Data Views of that mapping can further enable automation in network troubleshooting. A user such as a network professional can follow a few steps to troubleshoot a network problem including mapping the problem area, probing from a network map, generating a network topology and/or an AB path, and comparing the current network path with a golden path.

In network troubleshooting, a network engineer may use a set of commonly used commands, methods, and tools, either standard or proprietary. For example, these commands, methods, and tools include the following items:

The Command Line Interface (CLI): network devices often provide CLI commands to check the network status or statistics. For example, in a Cisco IOS switch, the command "show interface" can be used to show the interface status such as input errors.

Ping: a simple tool used to check whether a device is reachable from another device. For example, after a network reconfiguration, it is normally a best practice to ping the main servers from the core network devices to ensure no major outage of key applications.

Traceroute: a tool to check the route from a device to a destination device. This tool is useful to troubleshoot a connectivity problem.

Configuration management: a tool used to find differences of configurations of network devices in a certain period. This is important since about half of the network problems are caused by configuration changes.

The term "Object" refers to the term used in computer technology, in the same meaning of "object oriented" programming languages (such as Java, Common Lisp, Python, C++, Objective-C, Smalltalk, Delphi, Java, Swift, C#, Perl, Ruby, and PHP). It is an abstracting computer logic entity that envelopes or mimics an entity in the real physical world, usually possessing an interface, data properties and/or methods.

The term "Device" or "device" refers to a data object representing a physical computing machine (e.g. printer, router) connected in a network or an object (e.g. computer instances or database instances on a server) created by computer logic functioning in a computer network.

The term "Interface" refers to the set of logic objects or methods of a device that are used to communicate with another device or data object.

The terms "Q-map" or "Qmap" refers to a map of network devices created by the computer technology of NETBRAIN TECHNOLOGIES, INC. that uses visual images and graphic drawings to represent topology of a computer network with interface property and device property displays through a graphical user interface (GUI). Typically, a computer network is created with a map-like structure where a device is represented with a device image and is linked with other devices through straight lines, pointed lines, dashed lines and/or curved lines, depending on their interfaces and connection relationship. Along the lines, also displayed are the various data properties of the device or connection.

The term "Qapp" refers to a built-in or user defined independently executable script or procedure generated through a graphical user interface as per technology available from of NETBRAIN TECHNOLOGIES, INC.

The term "GUI" refers to a graphical user interface and includes a visual paradigm that offers users a plethora of choices. GUI paradigm or operation relies on windows, icons, mouse, pointers and scrollbars to display graphically the set of available files and applications. The mapping with the topology dependency and path generation are displayed on a GUI.

The term "Step" or "step" refers to a single independently executable computer action represented by a GUI element, that obtains, or causes, a network result from, or in, a computer network; a step can take a form of a Qapp, a system function, or a block of plain text describing an external action to be executed manually by a user, such as a suggestion of action, "go check the cable." Each step is thus operable and re-usable by a GUI operation, such as mouse curser drag-and-drop or a mouse clicking.

The term "modularized task-oriented standard procedure" refers to a set of steps with in-between logic control to perform a computer network task. The task may be those operations commonly identified in the computer network management field. This term is also used interchangeably with the term "Runbook." A Runbook (RB) is a modularized task-oriented standard procedure saved to the present inventive system to be shared with other users.

FIG. 1 illustrates a block diagram of an example network system 100. The system 100 may include functionality for managing network devices with a network manager 112. The network system 100 may include a network 104 that includes any number of network devices (not shown) that are managed. The network 104 devices may be any computing or network device, which belong to the network 104, such as a data center or enterprise network. Examples of devices include, but are not limited to, routers, access points, databases, printers, mobile devices, personal computers, personal digital assistant ("PDA"), cellular phones, tablets, other electronic devices, or any network devices. The devices in the network 104 may be managed by the network manager 112.

The network manager 112 may be a computing device for monitoring or managing devices in a network, including performing automation tasks for the management, such as path generation and comparison from the mapping 106. In other embodiments, the network manager 112 may be referred to as just a mapper when generating a map for a user 102. The network manager 112 may control the network topology 212 or path 208 generation further illustrated in FIG. 2. The network manager 112 may include a processor 120, a memory 118, software 116 and a user interface 114. In alternative embodiments, the network manager 112 may be multiple devices to provide different functions and it may or may not include all of the user interface 114, the software 116, the memory 118, and/or the processor 120.

The user interface 114 may be a user input device or a display. The user interface 114 may include a keyboard, keypad or a cursor control device, such as a mouse, or a joystick, touch screen display, remote control or any other device operative to allow a user or administrator to interact with the network manager 112. The user interface 114 may communicate with any of the network devices in the network 104, and/or the network manager 112. The user interface 114 may include a user interface configured to allow a user and/or an administrator to interact with any of the components of the network manager 112. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the network manager 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include the mapping system and tasks that are performed as part of the management of the network 104 including for the generation and usage of network topology and path generation functionality. Specifically, the mapping and path generation may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the network manager 112 may be coupled with the devices in the network 104 through a network or the network manager 112 may be a part of the network 104. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The network manager 112 acts as the operating system (OS) of the entire network 104. The network manager 112 provides automation for the users 102, including automated documentation, automated troubleshooting, automated change, and automated network defense. In one embodiment, the users 102 may refer to network engineers who have a basic understanding of networking technologies, and are skilled in operating a network via a device command line interface and able to interpret a CLI output. The users 102 may rely on the network manager 112 for controlling the network 104, such as with network topology mapping and path generation functionality from mapping 106. The mapping 106 may be a tool that are used/performed by/for the network manager 112 that includes path generation and comparison. Exemplary tools may include Isolated FCAPS Tools, Many Data Islands, Inventory, Monitoring, Log Management, and/or Ticket Management. Exemplary tasks may include Documentation, Troubleshooting, Provision, Security, Compliance, and/or Application Support.

Figure 2:
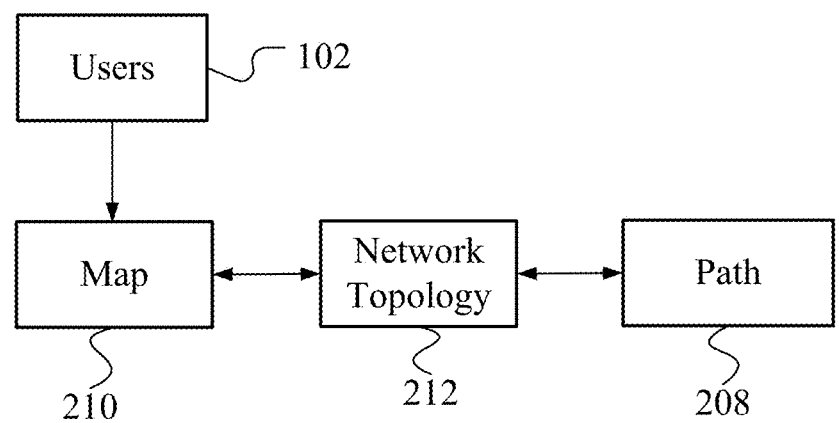
FIG. 2 illustrates a block diagram of an example network topology embodiment.

FIG. 2 illustrates a block diagram of an example network topology embodiment. As described above, the network manager 112 may generate a network topology 212 and/or a path with the map 210 for usage and control by users 102. The users 102 may use the network topology 212 or path 208 for further data collection and control of a network through the map 210. The map 210 may include a Qmap with network devices and their connections mapped. The network topology and/or path generation provides further data, control, and automation of those devices. The network topology 212 and the path 208 generation/comparison, as well as corresponding functions is further discussed below.

The mapping 210 (e.g. Qmap) can be created for an entire network, for a portion of a network, or for a group of network devices (referred to hereinafter as a "device group"). A device group is a group of devices with some common characteristics or relationship. In exemplary embodiments, some device groups are automatically created by the network manager, such as, for example, groups of devices connected to one another, groups of devices belonging to the same routing process, and/or groups of MPLS devices. The user can also define device groups, such as, for example, a group of devices that are being managed by the user. The user can add devices to a group and/or remove devices from the group as desired. A list of device groups is maintained by the network manager, and the user can select a device group and perform various automated operations on the selected device group, such as, for example, creating a mapping for the devices in the selected device group, extending a map to include device group neighbors (e.g., if one device is connected to another one in a device group, the device is considered to be the neighbor of the device group), and highlighting devices associated with the device group in a map display.

The interactive maps can be selectively displayed by the user to different levels of granularity (i.e., zoom in/out), with different views containing different types and/or amounts of information. For example, a high-level view showing many network devices might include icons representing the various network devices and the interconnections between them with little ancillary information, while a detailed view might show an enlarged view of a subset of the network devices with additional information about the displayed network devices and/or interconnections. In a typical embodiment, many levels of granularity are supported, from a high-level view showing the network devices and related interconnections to a low-level view showing, for example, representations of the network interfaces and related information (e.g., IP addresses, protocols, etc.) for a single network device. Thus, the map not only displays static network topology information including network devices and their connection but also displays network knowledge to a degree that is selectable by the user, allowing the user to toggle between different views.

Maps provide an interactive platform through which the user can direct different network management operations. For example, the user can select one or more network devices displayed in a map and perform various functions relating to the selected network device(s), such as, for example, displaying detailed information about the selected network device(s), obtaining configuration files from the selected network device(s), or testing the selected network device(s).

The network topology may include data differentiated into physical and logic-based relationships as to a device. For example, information about its routing protocol, its multicast modes, its Access List (ACL), and the communication interface (IP protocols and addresses, for example) with another device, are represented in a mapping (e.g. Qmap). With the ability to zoom for different display resolution and granularity for different data layers, a network engineer can toggle between multiple views within a map.

The information in the map may be logically divided into data layers, and each data layer is associated with one of a plurality of display resolutions (i.e., zoom levels) representing different levels of granularity or resolution at which the map may be viewed. Each layer of data and their representation can be automatically retrieved, stored and analyzed. The map can be used as a network management platform to automate many network management tasks, which would have been done by a network professional using the Command Line Interface (CLI). The automated tasks include network diagramming and documentation, performance troubleshooting, and design analysis. One systematic approach to troubleshoot a network problem involves mapping the problem area, probing the live network from the map to obtain current network information, and comparing the current network information with historical information maintained for the network. The current network information includes a path (e.g. AB path) through which data travels that can be compared with a golden path as discussed below.

In building a network mapping, map topology follows the TCP/IP layer structure. The many layers of network communication can include the Network Interface layer, also called Data Link layer, the Internet layer, also called Network layer, the Transportation layer, and the Application layer. The Network Interface layer is responsible for the lowest level of data transmission, facilitating communication with the underlying physical network. The Internet layer provides the mechanism for intersystem communications, controlling message routing, validity checking and composition and decomposition of message headers. For example, IP protocol, and Internet Control Message Protocol, such as Ping, operates at this layer. The Transport layer provides message transport services between applications running on remote systems, TCP or UDP protocol operates at this layer. Different device data and data types are associated with each layer of connection and communication. Device data include may include vendor information, model information, operating system, version and information, hostname, IP address, serial number and routing protocols (e.g. OSPF, BGP and ISIS). Interface data may include name, IP address, serial number, routing protocols, running status, bandwidth, etc., depending on the technologies involved and developed.

Figure 3:
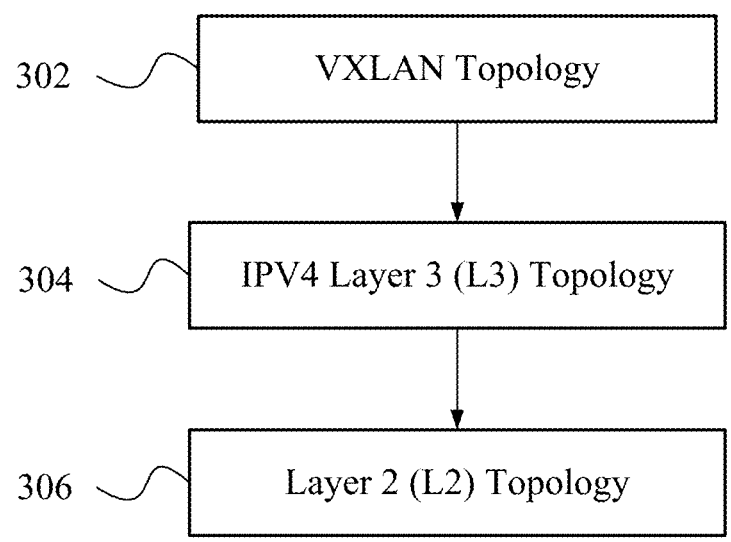
FIG. 3 is a flow chart of example layers in a network topology.

FIG. 3 is a flow chart of example layers in a network topology. The mapping 210 may include Layer 3 (L3) maps 304 and/or Layer 2 (L2) maps 306. An L3 map may be used to display the devices and their connections in network layer while an L2 map may show the physical connections between network devices. L3 and L2 maps may include and display different kinds of data, with L3 maps including data related to the network layer (i.e., layer 3) and L2 maps including data related to the data link layer (i.e., layer 2). These maps are driven by the mathematical model for the whole network.

Specifically, the L2 maps show the physical connections between the devices and the L3 maps show the logical connections in the network. The logical connections are connections between L3 network devices such as routers, firewalls and VPN devices. For example, L3 interfaces in the same subnet are connected in L3 maps. By zooming in and out of views, a user will be able to see multiple levels of granularity of the network. Higher zoom level views may show bigger pictures of the network connections at larger scale, such as data centers and their interconnections, while lower zoom level views show more detail.0s at device level and their detailed interactions.

The network topology shown in FIG. 3 may be referred to as topology dependency in which models of virtualization technology are improved. The topology dependency may include the Virtual eXtensible Local Area Network (VXLAN) topology 302 depending on the underlying IPv4 Layer 3 (L3) topology 304, which then may depend on IPv4 Layer 2 (L2) topology 306. The topology dependency may be recorded at the interface level.

Virtual eXtensible Local Area Network (VXLAN) is a protocol for network virtualization. Generally, VXLAN may be referred to as a virtualization layer or virtualization technology. VXLAN may rely on a VLAN-like encapsulation. More specifically, VXLAN is a protocol for running and stretching a layer 2 network over a layer 3 network, which may be referred to as a VXLAN segment/tunnel by utilizing encapsulation. Due to this encapsulation, VXLAN could also be called a tunneling scheme to overlay a layer 2 network on top of a layer 3 network.

In the map, VXLAN endpoints, which terminate VXLAN paths/tunnels, may be either virtual or physical switch ports. Although VXLAN is one example of an overlay encapsulation protocol, other examples of overlay encapsulation protocol, other than VXLAN, may be applied to the network topology discussed herein. For example, Virtual Private LAN Service (VPLS) and Overlay Transport Virtualization (OTV) are other network topologies with an overlay deployment. A current version of VXLAN was officially documented by the Internet Engineering Task Force (IETF) in Request for Comments (RFC) 7348; ISSN: 2070-1721 (last updated Apr. 7, 2017), which is herein incorporated by reference. VXLAN may be considered to be a layer 2 overlay mechanism on a layer 3 network. The overlay may be referred to as a VXLAN segment or VXLAN overlay network. VXLAN provides a mechanism for further utilizing a layer 2 network.

As described with respect to FIGS. 1-2, a mapping is generated for visualizing and managing a network. The mapping may incorporate a display of both underlay and overlay deployments. The mapping can display both underlay and overlay path of networks with an overlay deployment, such as a VXLAN network.

Figure 4:
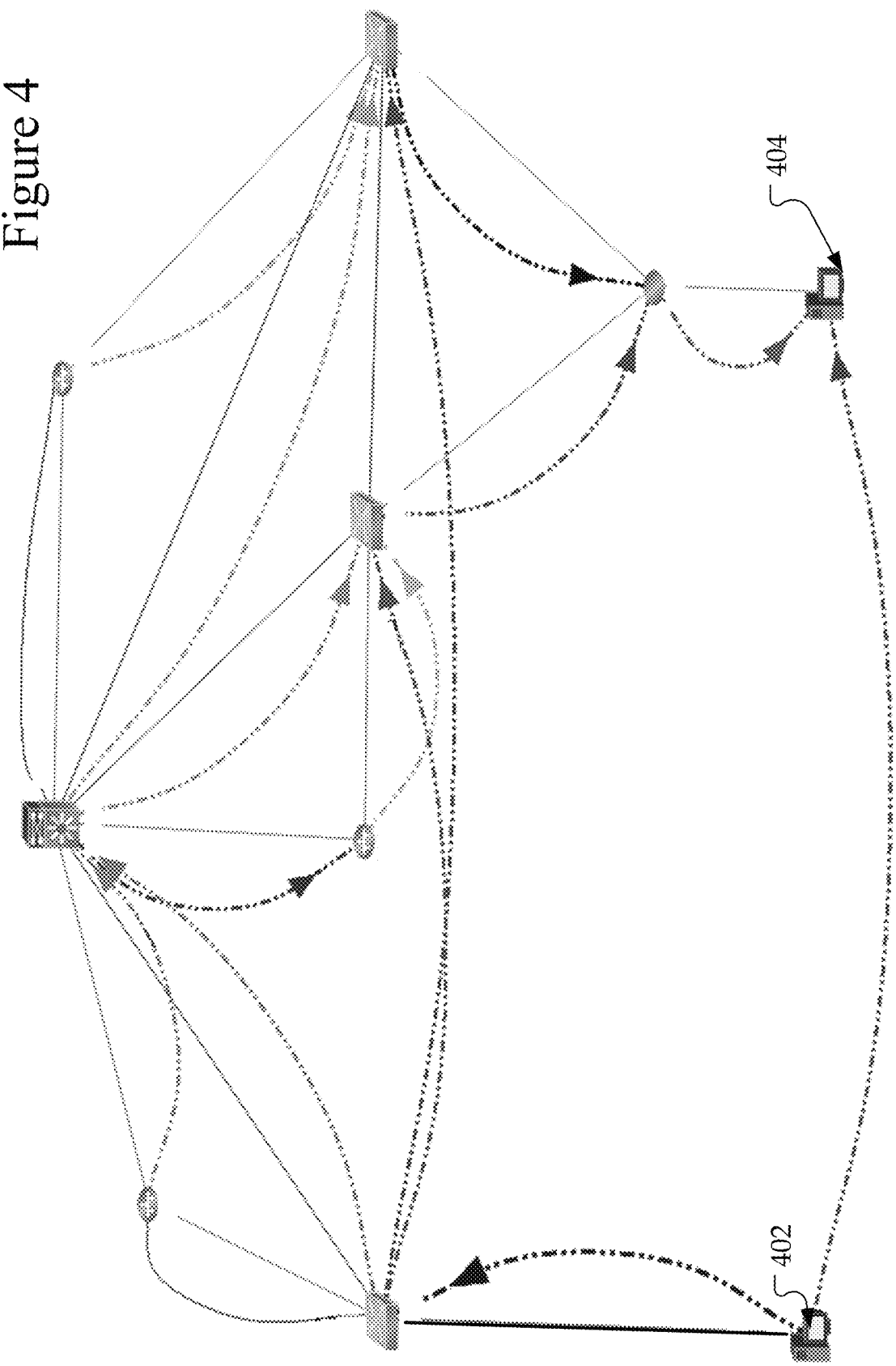
FIG. 4 is an example screenshot of a network topology with multiple paths.

FIG. 4 is an example screenshot of a network topology with multiple paths. FIG. 4 illustrates devices a mapping with different devices and paths amongst those devices. For example, host 402 and host 404 have a direct path between them, but also include multiple paths through other devices (not labeled). The mapping system may operate to discover the paths amongst the devices. Discovering the path can be accomplished without the need to select the path type (L3 or L2) because the mapping system can automatically discover the corresponding path and the underlay paths. In one embodiment, when a source device IP address and a destination device IP are in the same subnet, the mapping system can discover the L2 path first; otherwise the mapping system can discover the L3 path first. If the outbound interface's topology depends on another underlay topology the type, the system can automatically discover the underlay path.

Figure 5:
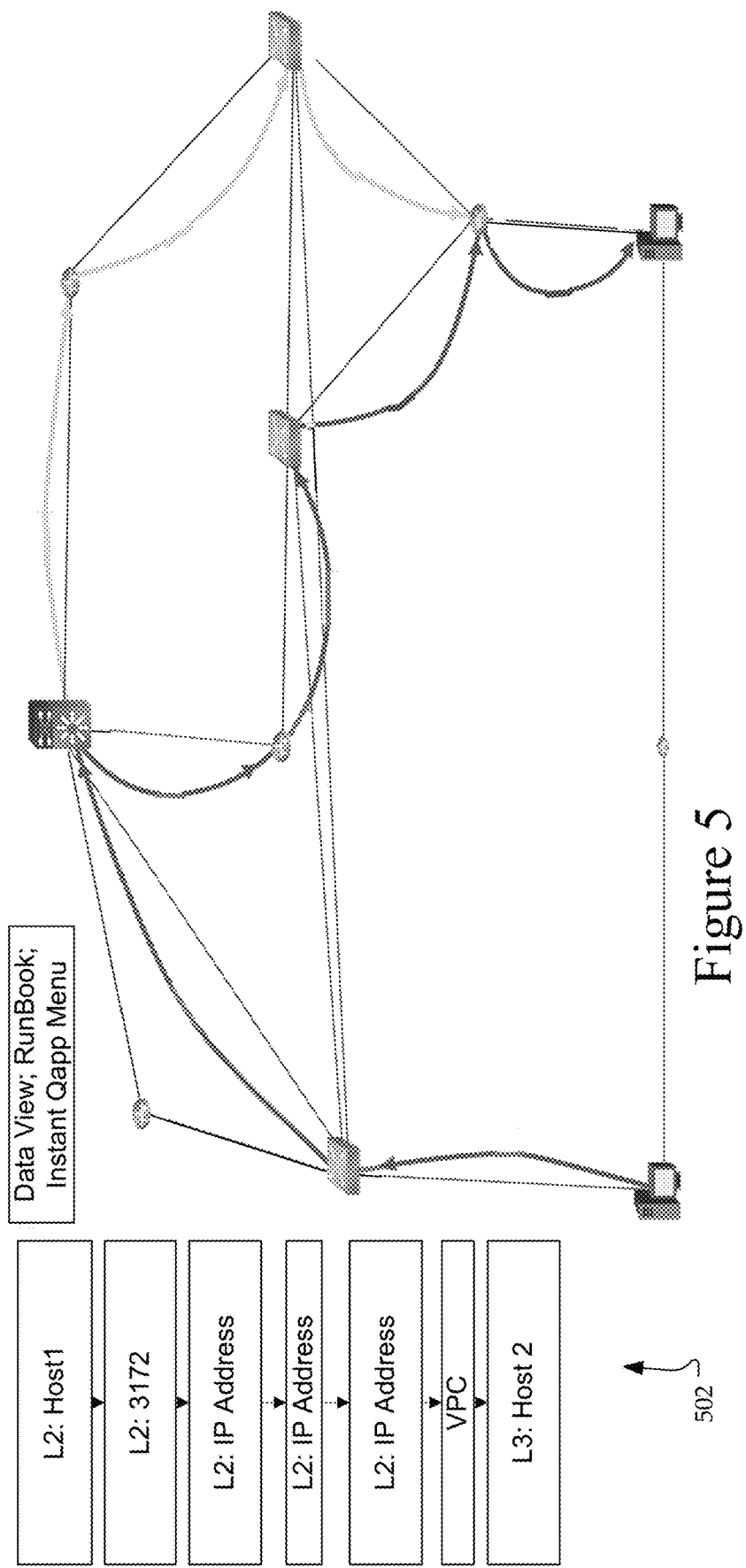
FIG. 5 is another example screenshot of a network topology with multiple paths.

FIG. 5 is another example screenshot of a network topology with multiple paths. The path result pane 502 is further illustrated and described with respect to FIG. 7. The network topology in FIG. 5 is a model for topology dependency. For example, L3 topology depends on L2 and VXLAN depends on L3, etc. The mapping system can automatically discover the corresponding path and underlay paths without the user selecting the path type (L3 or L2). The mapping provides flexibility for mapping of the path(s). Specifically, the type of path for each hop/leg of the path can be selected by the user.

Figure 6:
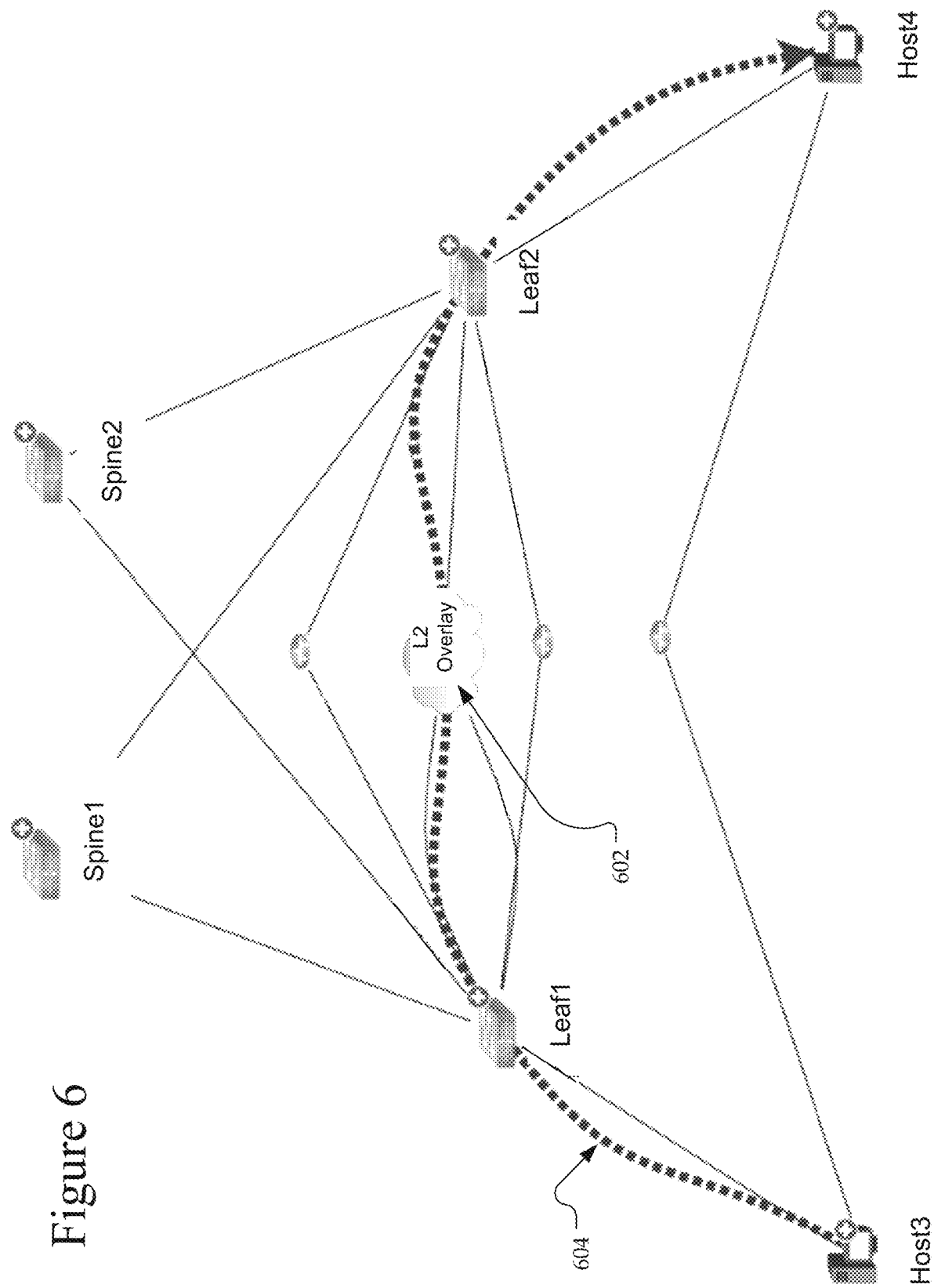
FIG. 6 is an example screenshot of a network topology showing different layers.

FIG. 6 is an example screenshot of a network topology showing different layers. Specifically, an AB path crosses an overlay deployed network to illustrate topology dependence in FIG. 6. The map provides a visual indication of not only the connection of the underlay network but also that of the overlay network built on top of the underlay network. This map may be useful for hybrid data centers with both underlay and overlay deployments. Specifically, the mapping system can calculate both underlay and overlay path of networks with overlay deployment (e.g. VXLAN, VPLS, or OTV). The topology dependence that is introduced in the path framework can automatically select path types (e.g. L2, IPsec VPN, or VXLAN path) to calculate based on the topology dependence types of outbound interface at each hop. An interface can have a dependency with multiple topology types, and each topology type may correspond to a path type. When a user calculates a path, the mapping system may determine what type of path to calculate based on the topology type of the outbound interface and then look up the topology dependence types to calculate another type of path at a hop. FIG. 6 illustrates different paths, including showing an L2 overlay 602 with a corresponding path 604 for the L2 path.

Figure 7:
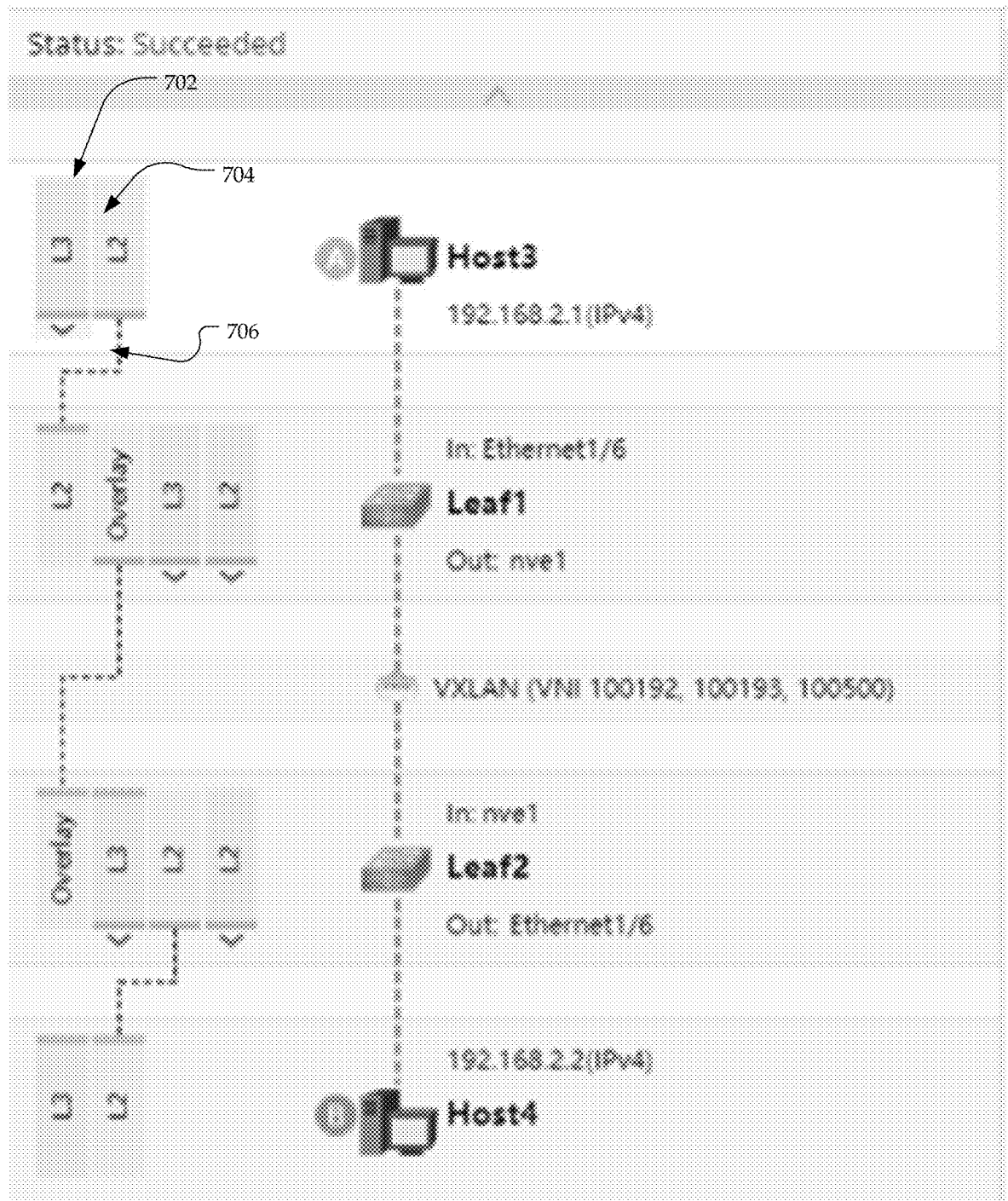
FIG. 7 is an example screenshot of a path result pane.

FIG. 7 is an example screenshot of a path result pane. In one embodiment, the path result pane can be displayed adjacent a mapping, such as shown in FIG. 5. The path result pane can help to visualize the topology dependency. Specifically, a user can better understand the topology dependency by the mapping showing the dependency. The path result pane shows hop nodes along an A-B path, including inbound and outbound interfaces at each hop. At each hop, the path result pane displays the path types based on topology dependences, which may help a user quickly understand the topology dependences behind each device. The map allows a user to click a path type to display it on a map.

FIG. 7 illustrates four example devices (i.e. nodes) with a layer designation for each device. For example, for Host3, there is a layer 3 L3 702 and a layer 2 L2 704 layer options. The path 706 from Host3 to Leaf1 is shown in this example from L2 704 to L2 for Leaf1. Likewise, the path then is from overlay at Leaf1 to Overlay at Leaf2, and from L2 at Leaf2 to L2 at Host4.

The dependency of an interface between the overlay and the underlay (including the dependency between the topologies in the system) can be recorded as shown in the example of Table 1. Table 1 is merely one example of topology dependency information being recorded:

TABLE 1

Topology dependency information recorded.

| Identification | Type | Description | Sample |
|---|---|---|---|
| intfs.topoDep.topoType | string | The topology types of the current interface. | "intf_name": "F 0/0", "topologies": [ |
| intfs.topoDep.dep | object | | { "topology_type": |
| intfs.topoDep.dep.topoType | string | The topology type of one dependency interface of the current interface. | "IPv4 L3 Topology", "dependency": { "topology type": "L2 Topology ", |
| intfs.topoDep.dep.intf | string | One dependency interface of the current interface. | "interface ": "F0/0" |

Figure 8:
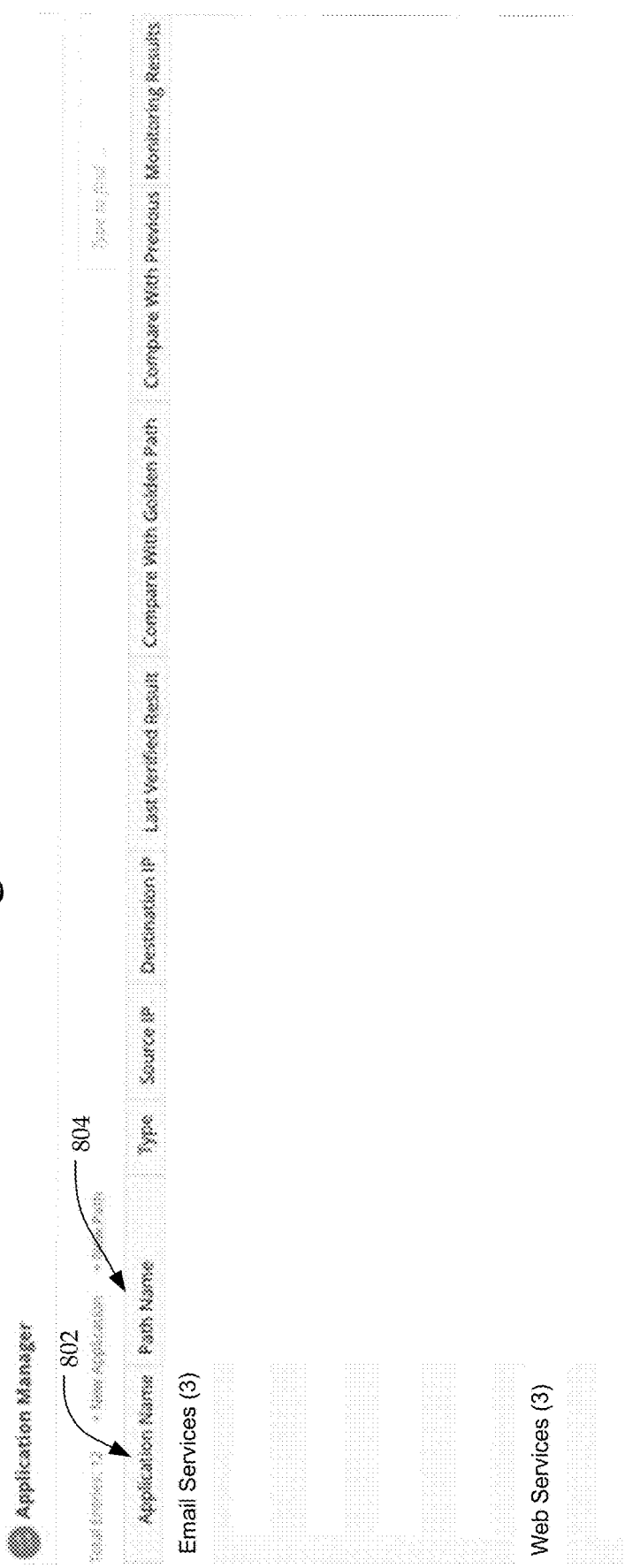
FIG. 8 is an example screenshot of an application assurance module.

FIG. 8 is an example screenshot of an application assurance module. The application assurance module may also be referred to as the application manager. The application manager can identify and verify network paths based on an application being used. The application manager manages paths based on applications and periodically verifies the application paths to detect network changes. FIG. 8 is one example of the application manager interface and shows multiple applications 802. The first example application is email services (EMAILSSERVICE), and the applications 802 list six other example applications. Different applications may have different paths and may be used for identifying and troubleshooting a problem with a particular device or path. For each application, there is a list of paths 804. For each of the paths 804, there may be a type (e.g. L2 or L3), a source IP, source port, source device, destination IP, destination port, protocol, result, and comparison columns. The result may be whether the path succeeded or failed. The comparison may include whether a particular path has changed relative to a golden path or relative to a last successful path. The source and destination information can identify the path. Other options in the application manager for each of the paths may include a last verified result, a result monitoring, last verified time, and history. The application manager can not only define applications and related paths (i.e. source, destination, etc.), but can schedule verification of paths (e.g. path succeeded, path failed, or path changed). This can be used to identify when a path fails and requires troubleshooting. The golden path comparison is further discussed below.

Figure 9:
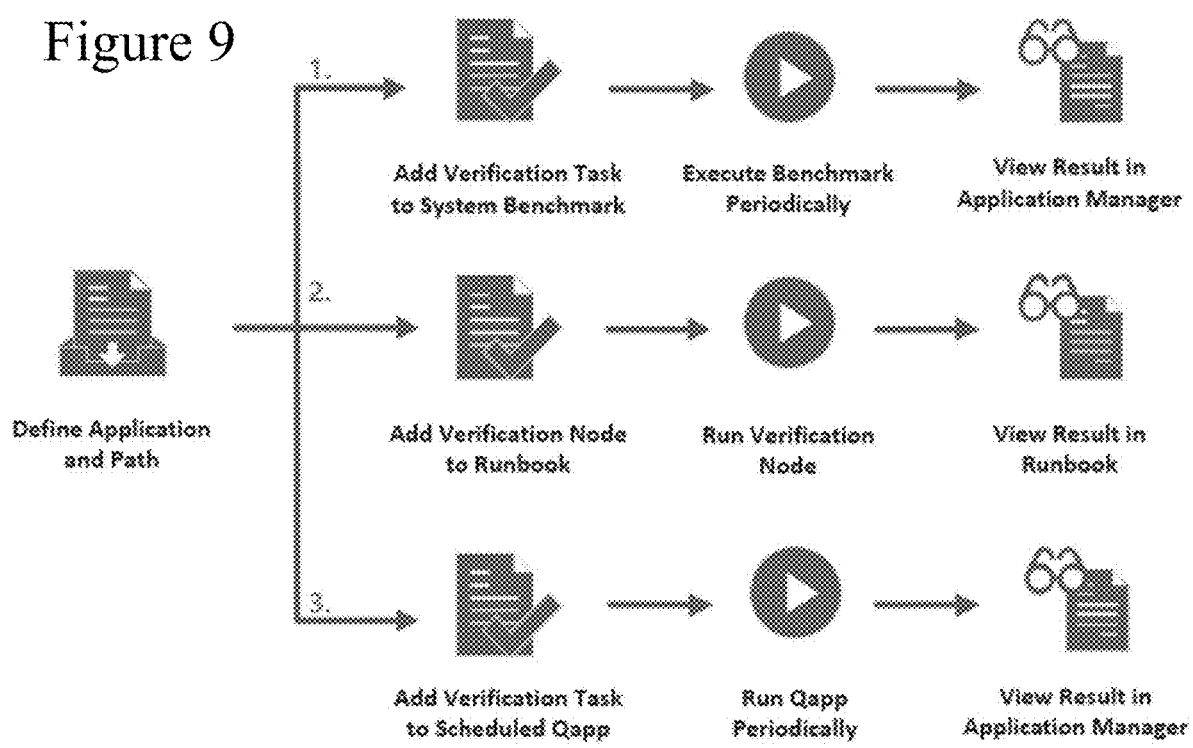
FIG. 9 is a flow chart of an application manager.

FIG. 9 is a flow chart of an application assurance module or application manager. The application manager may manage applications and paths as well as to show the path verification results. The application and path are defined (such as shown in FIG. 8) first. In a first flow, a verification task can be added to the system benchmark. The benchmark can be executed periodically and the result shown in the application manager. In a second flow, a verification node is added to a Runbook, the verification node is run and the result is shown in the Runbook. In a third flow, a verification task is added to a scheduled Qapp, the Qapp is run periodically, and the result is shown in the application manager.

Figure 10:
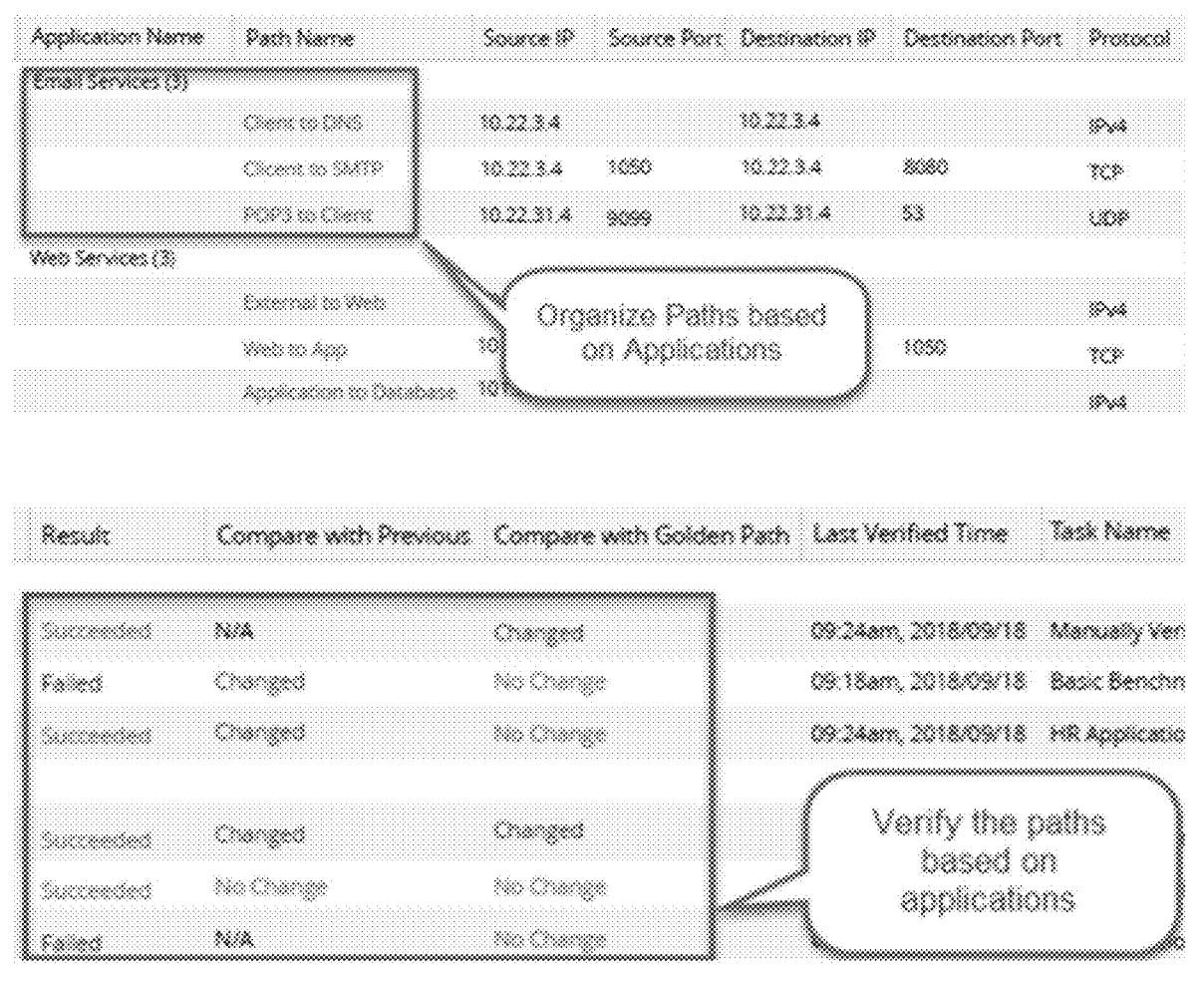

FIG. 10 is an example screenshot of managing applications with an application assurance module. FIG. 10 illustrates that paths are organized based on applications, such as email services. For each of the paths, there is a verification for that path based on the application. There is a result (success vs. failure), a comparison of a previous result, and a comparison with a golden path. The comparisons determine if the path has changed, which may indicate a problem.

Figure 11:
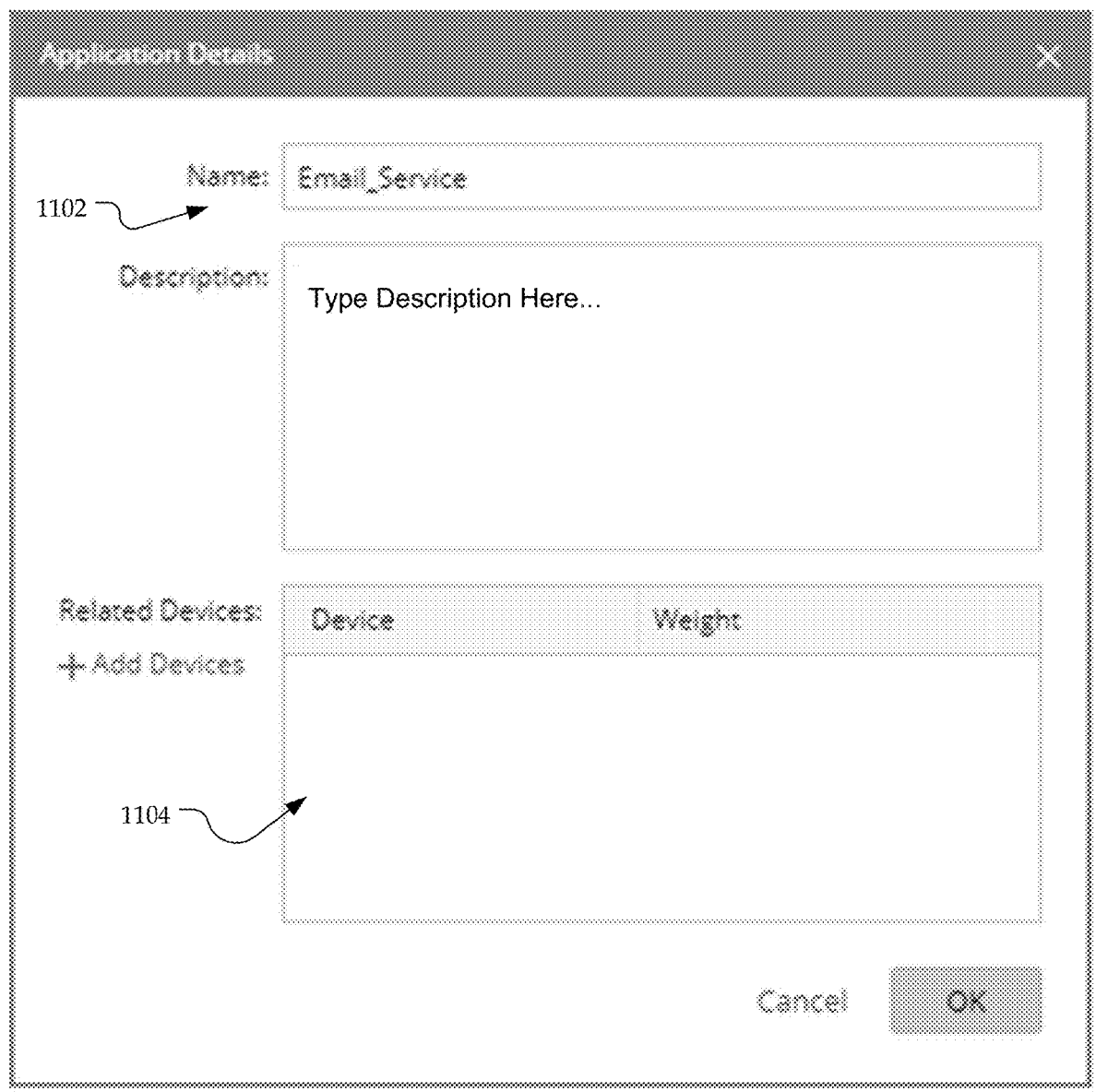
FIG. 11 is an example screenshot of defining an application with an application manager.

FIG. 11 is an example screenshot of defining an application with an application assurance module. The user can first define an application in FIG. 11 and then define a path in FIG. 12 below. A user can create applications and then assign dedicated paths to each application to manage the paths based on the application. The application name 1102 of the application can be defined. FIG. 11 illustrates a name 1102 as Email_Service. There may also be a description for the application. Related devices 1104 can be added for application Email_Service. After defining the application, the path can be defined in FIG. 12.

Figure 12:
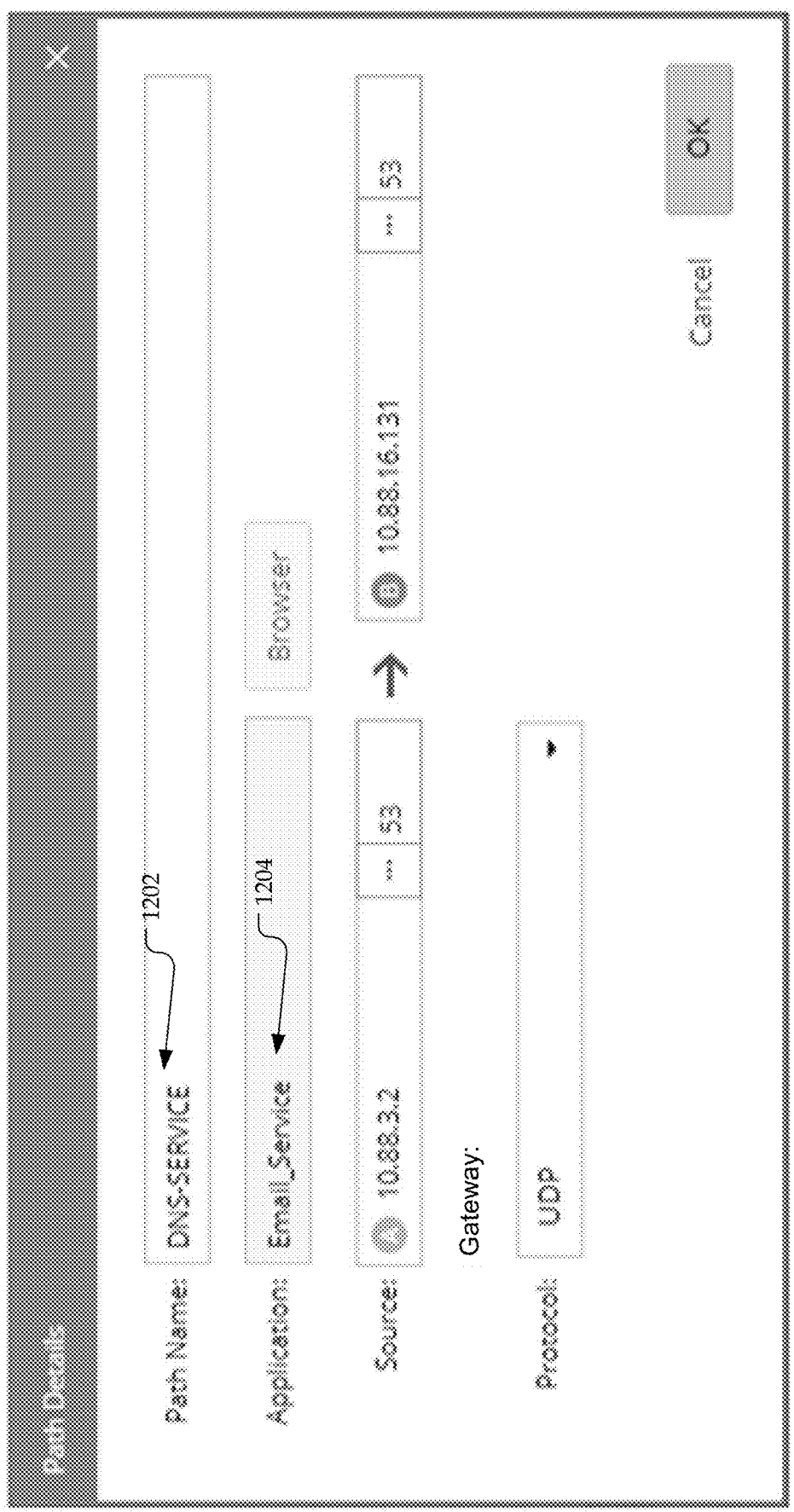
FIG. 12 is an example screenshot of defining a path with an application manager.

FIG. 12 is an example screenshot of defining a path with an application manager. Specifically, a user can define the path details, including the name 1202 of the path (DNS-Service in this example) and the Application 1204 (Email_Service in this example). A source and destination are shown for the path DNS-Service and a protocol is defined (e.g. UDP). Rather than adding paths one-by-one in FIG. 12, the paths can be added in a batch file in FIG. 13.

Figure 13:
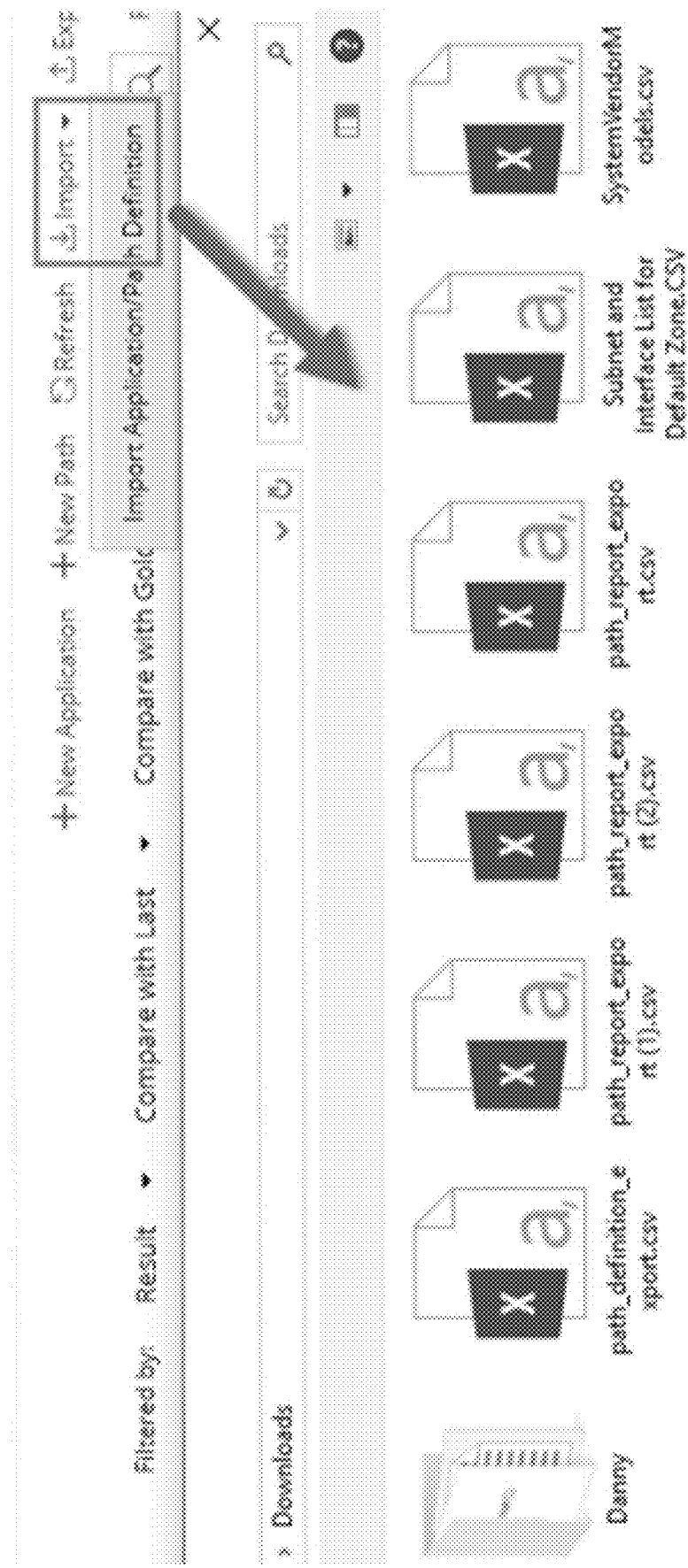
FIG. 13 is an example screenshot for importing a batch of path definitions with an application manager.

FIG. 13 is an example screenshot for importing a batch of application/path definitions with an application manager. FIG. 13 illustrates an import feature by which a spreadsheet of paths (e.g. a CSV file) can be imported for defining a number of paths. The batch file may also define one or applications. The definition of the application(s) and path(s) is imported to the application manager.

Figure 14:
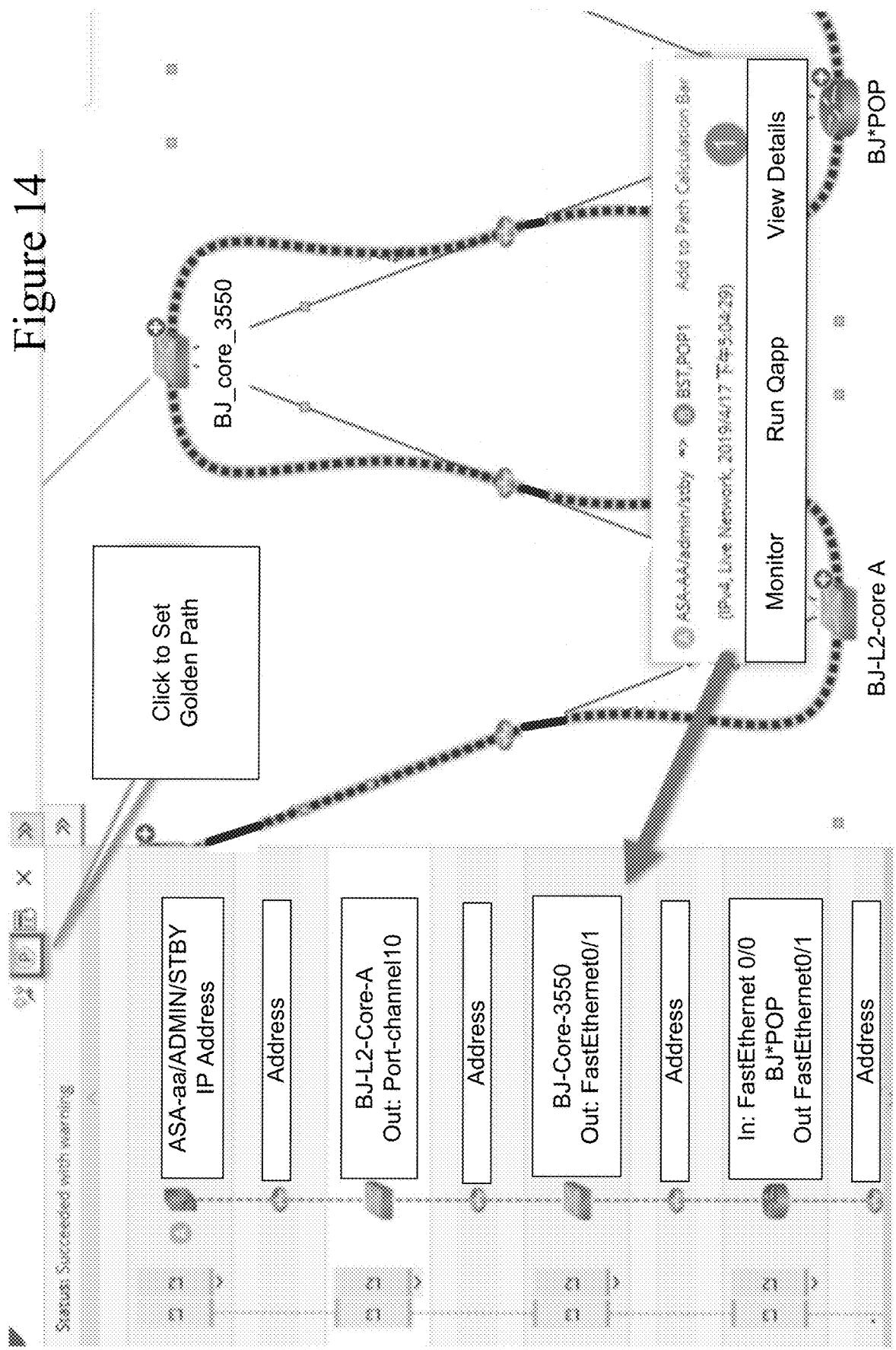
FIG. 14 is an example screenshot of golden path definition.

FIG. 14 is an example screenshot of golden path definition. A golden path is a calculated path that travels exactly as the traffic travels in the real network. The golden path can be set for comparison with subsequent paths. The golden path is set as a compare point for a current state of the network to determine potential problems. The system can periodically verify or monitor the paths and automatically compare the results with one or more golden paths to detect changes.

FIG. 14 illustrates that the golden path can be set manually by a user selecting a button to set golden path and then selecting the path. The path result pane and the map illustrate the devices/nodes through which the golden path travels. The path result pane shows the overlay layers for the path (e.g. L3 in FIG. 14). The map shows the path traveling over those nodes at the selected layer.

Figure 15:
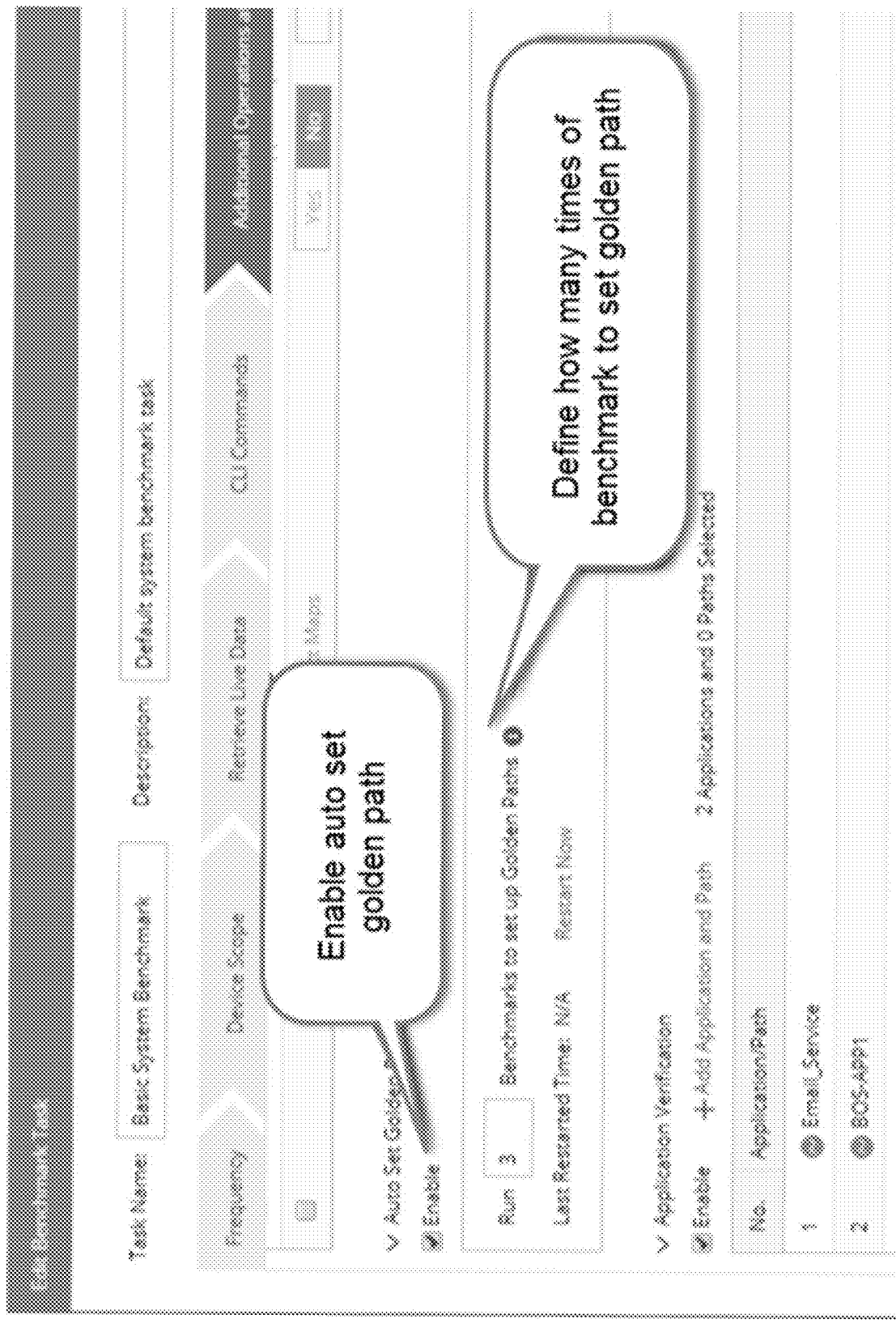
FIG. 15 is an example screenshot of an automatic definition of a golden path.

FIG. 15 is an example screenshot of an automatic definition of a golden path. There may be a feature for automatically setting (auto set) the golden path. The golden path may be automatically set after being run a certain number of times. The system allows the user to define how many times a benchmark needs to be measured before setting a golden path.

Figure 16:
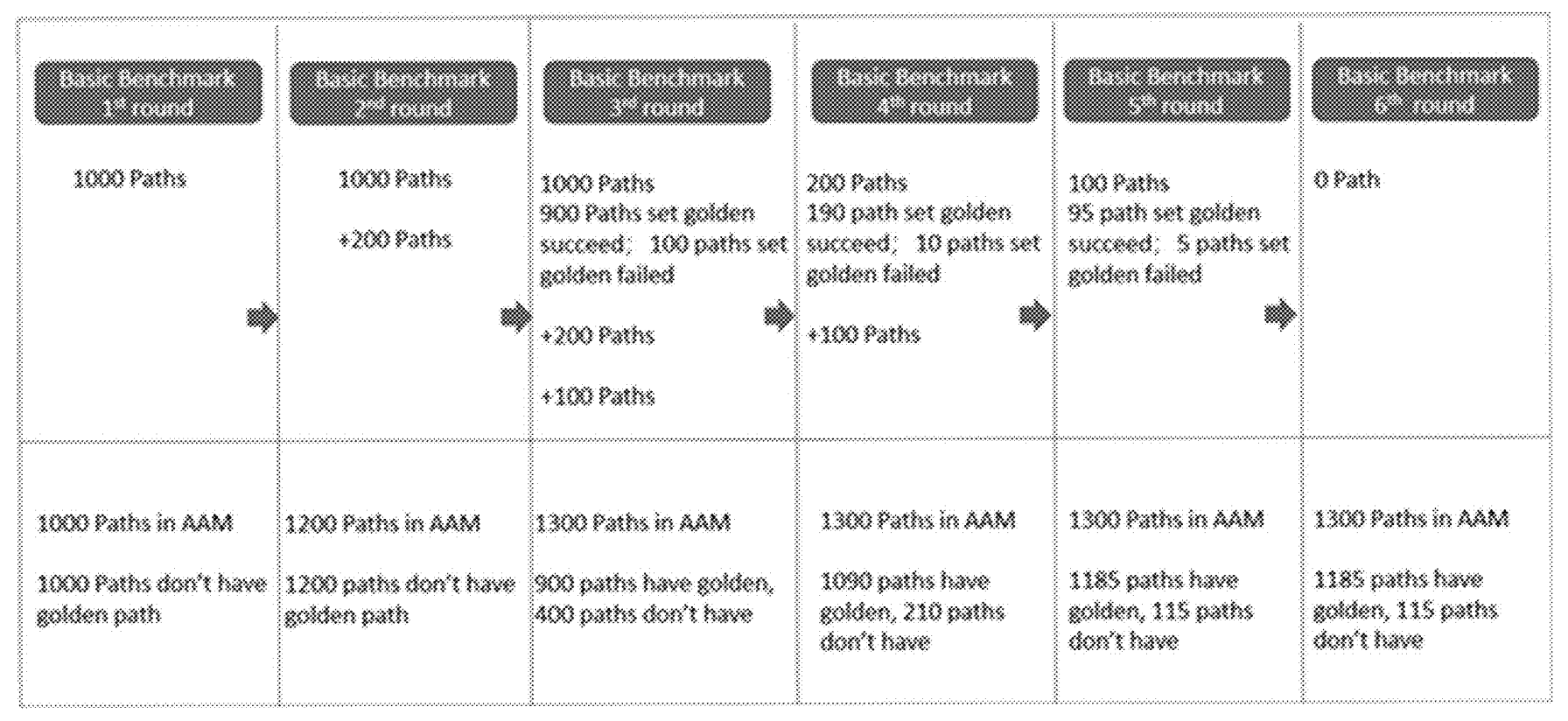

FIG. 16 is an example flowchart of logic for automatically setting the golden path. A series of benchmarks are measured and depending on the results, the golden path is established. FIG. 16 illustrates merely one example showing the logic for automating the golden path definition. FIG. 16 illustrates six rounds for the basic benchmark. There can be more or fewer rounds for establishing a golden path. The flowchart includes the number of paths in the application assurance module (AAM or application manager).

The auto setup golden path function may include "x" benchmarks to set up the golden path. The setup is used to specify that if the results of running a benchmark for a path continuously "x" times are both successful and the same, then the system can automatically set the last result as the golden path. Otherwise, the path is unable to be set via the auto setup golden path function. The logic of consecutively running "x" times is shown in FIG. 16, which takes default 3 times for example).

In the first round, consecutive "x" times works on each path without a golden path set in the application manager. As shown in FIG. 16, there are 1000 paths in the application manager (identified as the application assurance module AAM) in a first round basic benchmark. 1000 paths will be automatically added to the auto set golden path task. In one embodiment, the auto set golden path feature is automatically enabled. In the 2nd round basic benchmark, 200 new paths are added to the AAM. The system calculates paths for the original 1000 paths and the newly added 200 paths. In the 3rd round basic benchmark, 100 new paths were added to the AAM. The mapping system calculates paths for the original 1200 paths and the newly adds 100 paths. At this time, the 1000 paths originally defined in the first round of calculations have reached the limit of 3 times. Assume that 900 paths among of the 1000 path are calculated successfully for 3 consecutive times and the path results are the same, then the system automatically sets the golden path for the 900 paths by using the third path calculation results. There are also 100 Paths among of the 1000 paths that do not meet the conditions for setting golden path, so their golden paths will not be set. In the 4th round basic benchmark, because the first 1000 paths have reached the limit of 3 times, the system will not calculate golden paths for them again. In the 6th basic benchmark, all paths have reached the times limit of auto set golden path, and the basic benchmark no longer calculates path for the golden path.

Application paths can be verified in batch. The mapping system can periodically monitor or verify the application paths and trigger an alert or send an email when the paths change. The monitoring may include verifying application paths via a benchmark task (FIG. 17), monitoring application paths via Qapp scheduler (FIG. 18), or view results (FIG. 19).

Figure 17:
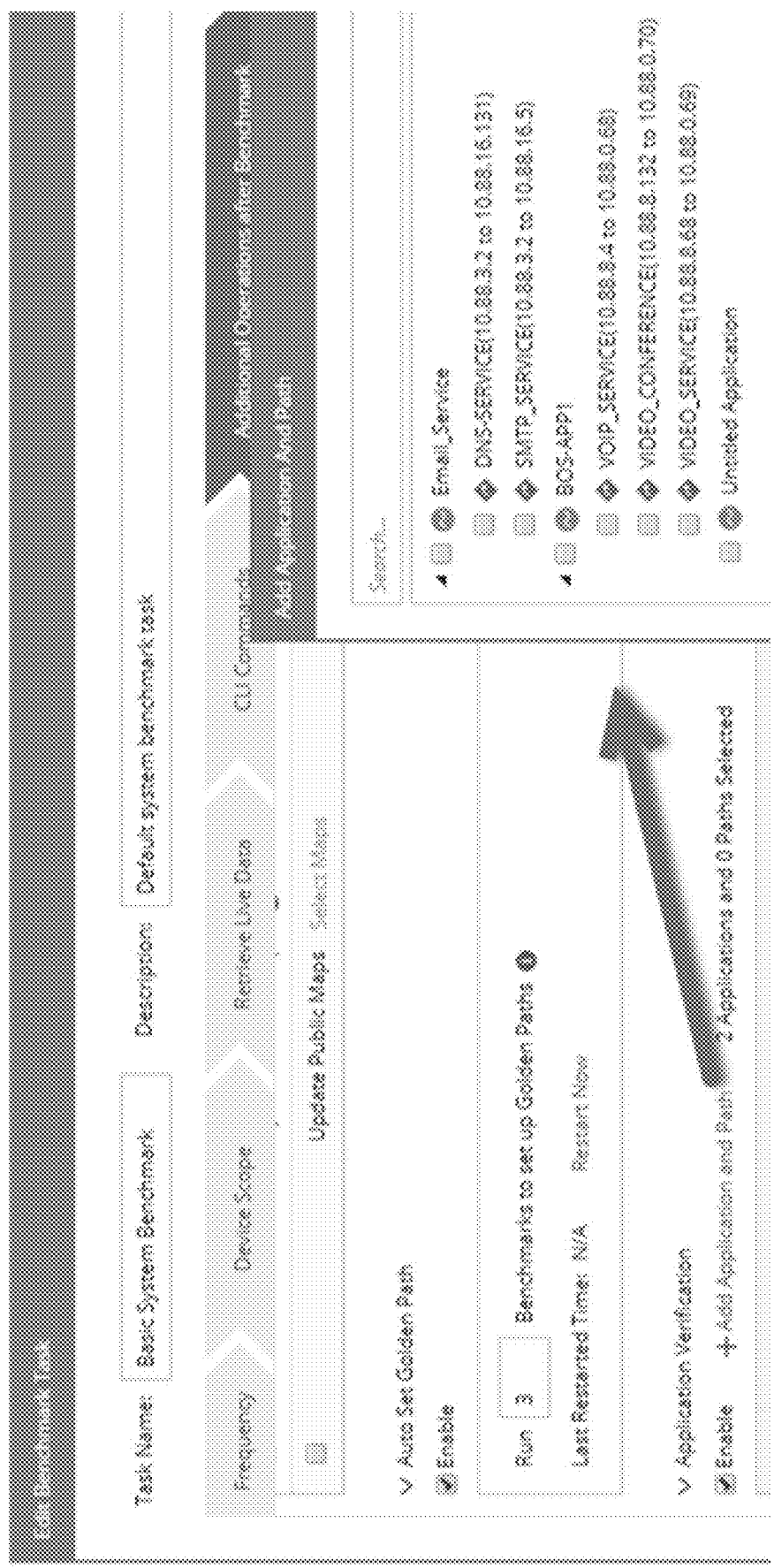
FIG. 17 is an example screenshot of verifying application paths via a benchmark task.

FIG. 17 is an example screenshot of verifying application paths via a benchmark task. To improve the efficiency of path calculation, the system uses the data retrieved from the benchmark task to perform a path calculation with cache data. Application paths can be added to a benchmark task. Each time the benchmark is executed, the application's path(s) will be verified. FIG. 17 shows where a user can "Add Application and Path" and displays a window for selecting a particular application and selecting a path for that application. The path is divided into full path and segmented path. In the application manager, the result of full path is displayed (Successful or Failed). If full path is a load balance path, only when all branch paths succeed, the full path succeeds; otherwise, the full path is considered to have failed. When the system compares the current path with the last calculated path and/or the golden path, it will compare the device, incoming interface, and outgoing interface of each hop of the full path. If it is consistent, the system considers the path unchanged; otherwise, the path is considered changed.

Figure 18:
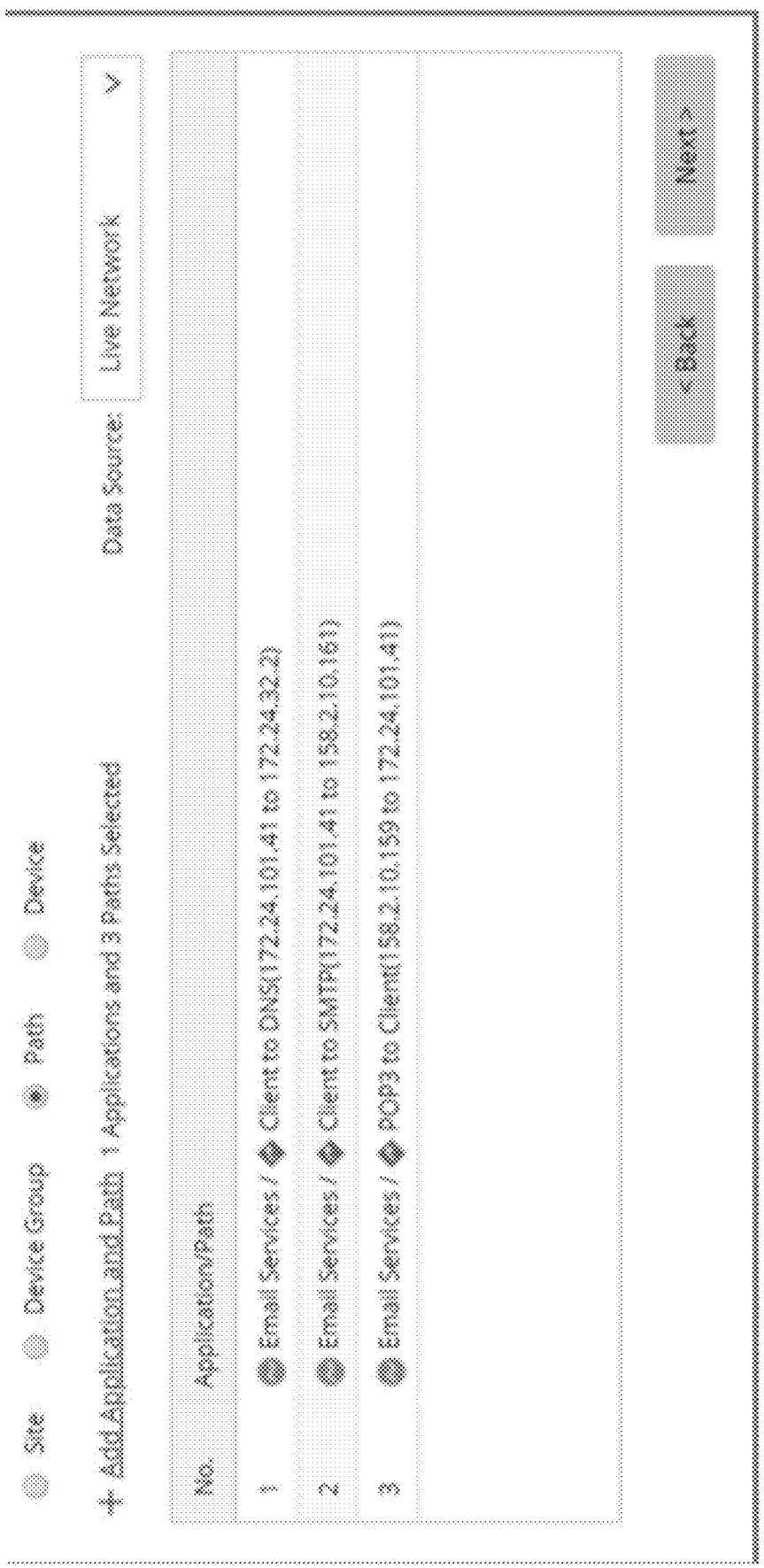
FIG. 18 is an example screenshot of monitoring application paths via a scheduler.

FIG. 18 is an example screenshot of monitoring application paths via a scheduler. Specifically, FIG. 18 illustrates adding application paths to a Qapp scheduler to periodically monitor the paths. Once the paths have changed, the system can detect changes and notify the user of the changes.

When a user monitors application paths in a Qapp Scheduler or benchmark, the verification results are be recorded and displayed in the application manager. FIG. 19 is an example screenshot showing latest results for the application manager. FIG. 19 only shows a portion of the results screenshot and omits most of the columns. The overall result 1902 (e.g. succeeded or failed) is shown for each application path. In addition, for each application path the comparison with the last path 1904 and the comparison with the golden path 1906 is made for determining whether the application path has changed. The application manager shows the latest results and supports a variety of filter methods to filter the result. The latest results in the application manager can be exported (e.g. to a CSV file).

Figure 20:
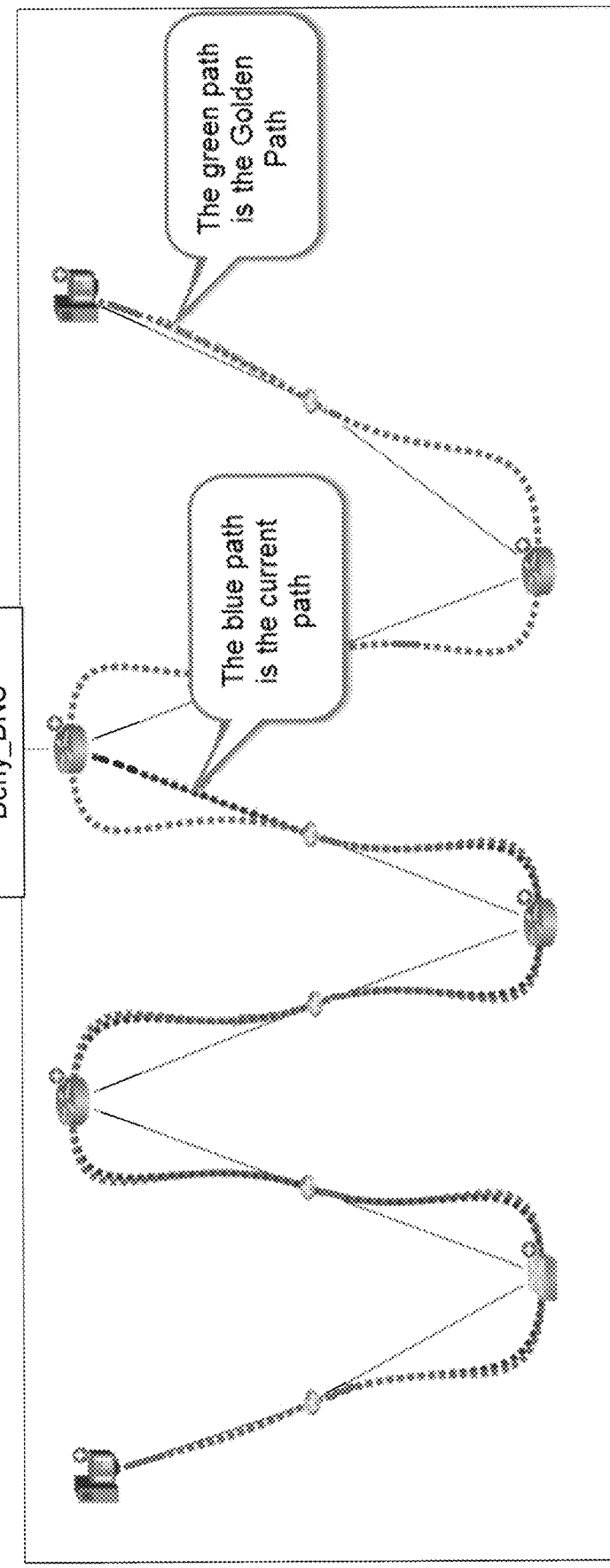
FIG. 20 is an example screenshot showing differences in the comparison of paths.

FIG. 20 is an example screenshot showing differences in the comparison of paths. Differences between the current path and the compared path (e.g. golden path or last path) can be displayed on the map. FIG. 20 shows a current path as compared with the golden path. Visualizing the differences can help the user for troubleshooting.

Figure 21:
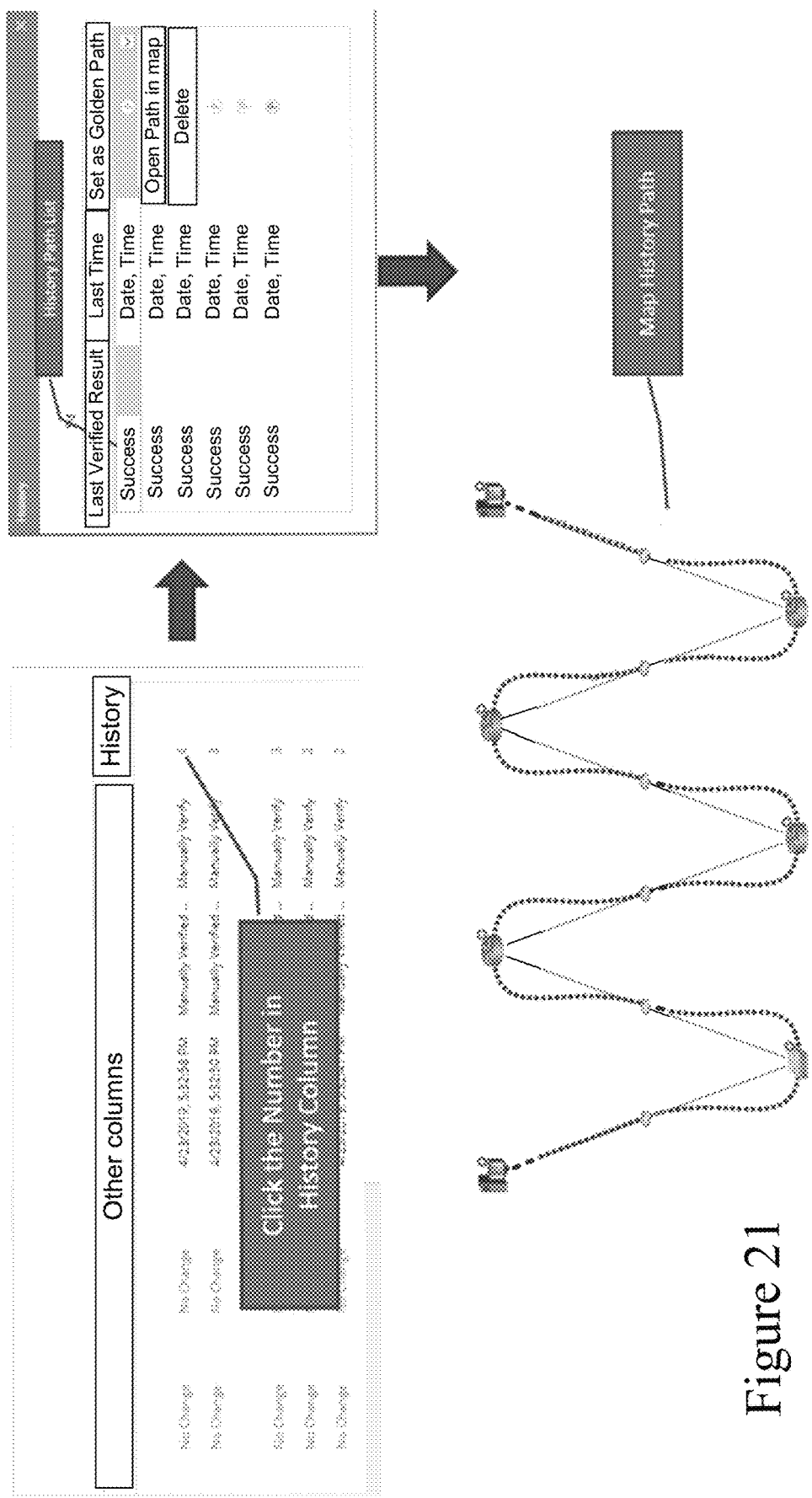
FIG. 21 is an example screenshot showing a history of paths.

FIG. 21 is an example screenshot showing a history of paths. The application manager can not only compare the current path with the last path and the golden path, but can also store a history of paths. FIG. 21 illustrates that the user can click on the number in the history column of the application manager to be shown a list of historical paths. Each of those historical paths can be selected to be mapped so that each of those paths can be visualized on the map.

Figure 22:
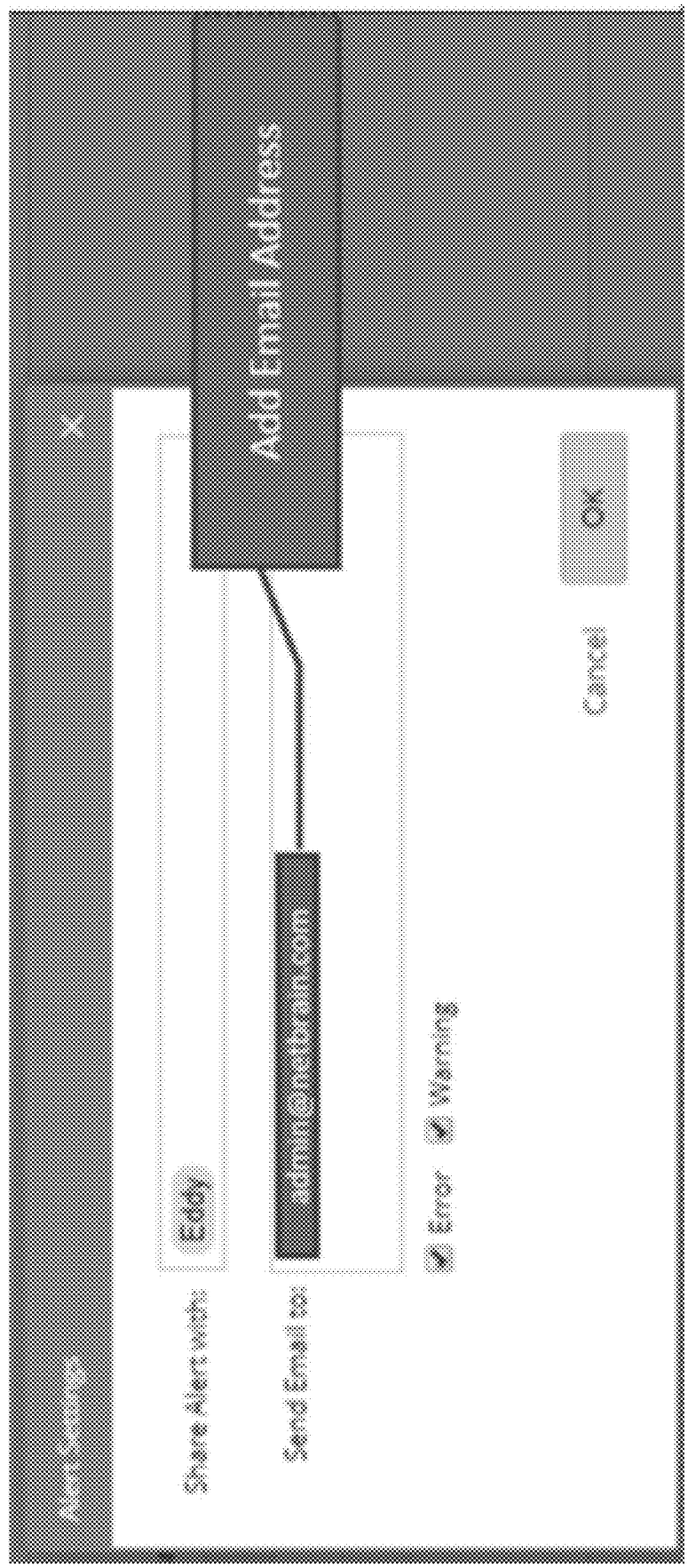
FIG. 22 is an example screenshot for sending an alert notification via email.

FIG. 22 is an example screenshot for sending an alert notification via email. The application manager supports sending verification results to specified users via email. FIG. 22 shows a window for setting an email for notifications/alerts. This option may be from the application manager alert settings, the Qapp scheduler, or the benchmark.

Figure 23:
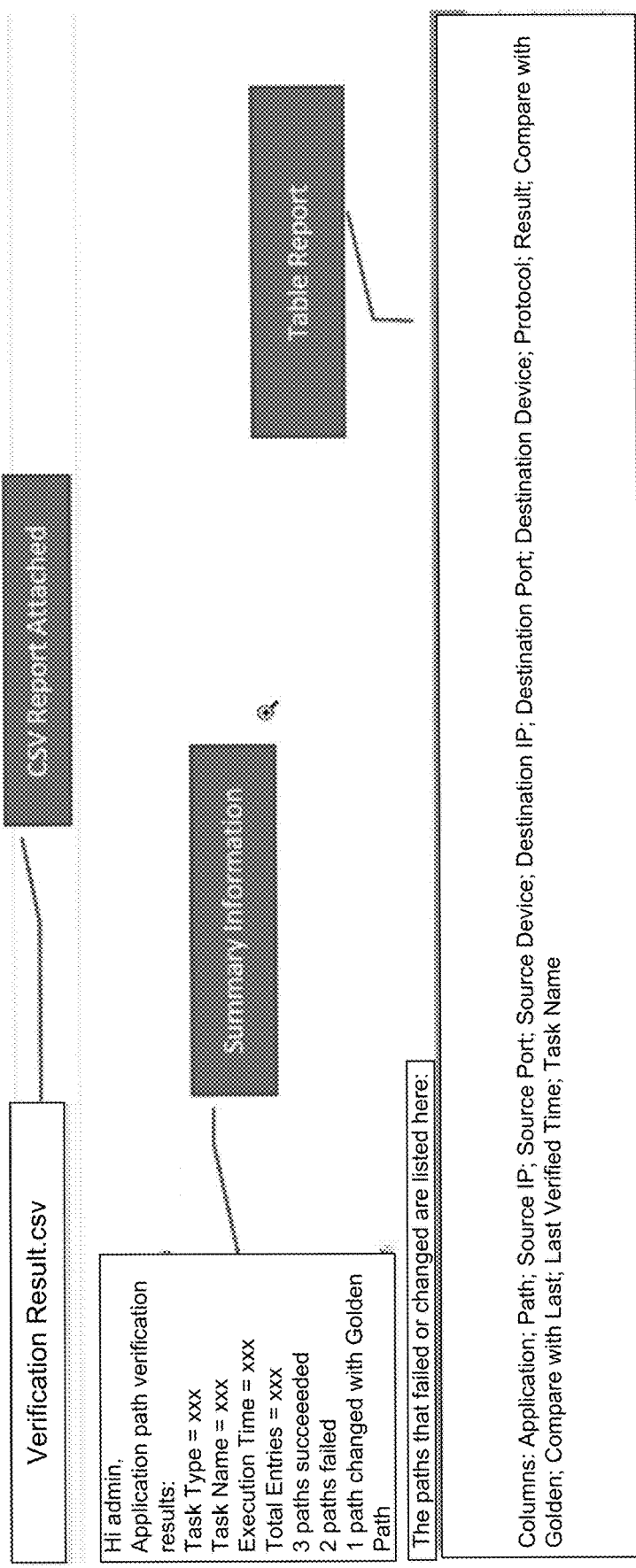
FIG. 23 is an example screenshot for viewing an alert notification via email.

FIG. 23 is an example screenshot for viewing an alert notification via email. The alert may include a summary of information about the alert, including the application path verification results, task type, task name, execution time, total entries, which paths succeeded/failed, and which paths changed as compared with the golden path or previous paths. The email may include an attachment summarizing the path information, such as with a CSV file. The body of the email may include a table of all information about the application paths.

Figure 24:
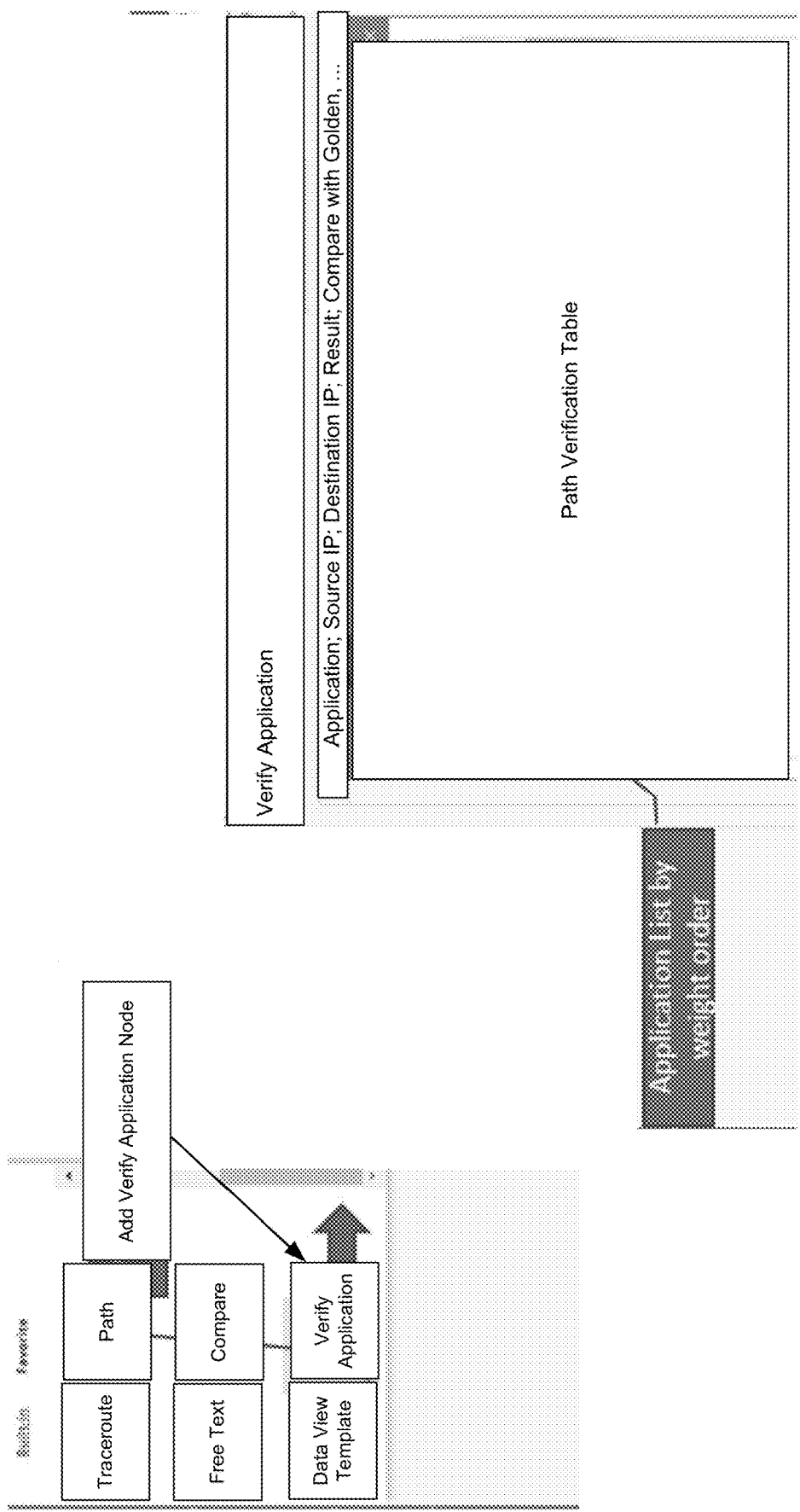
FIG. 24 is an example screenshot for verifying application paths via Runbook automation.

In a network change flow, users can define which applications need to be verified after the network change through the Runbook node and ensure that the network change does not affect these important applications. During troubleshooting, users can verify application paths via Runbook automation, and the system can automatically filter out the application paths related to devices on a map. FIG. 24 is an example screenshot for verifying application paths via Runbook automation. The Runbook adds a verify application node to enable a user to verify applications and paths related to devices on a map via Runbook automation. Specifically, FIG. 24 illustrates an "add verify application node" button that is selected by the user. Upon requesting to add a verify application node, a listing of applications is shown. The applications may be displayed in weight order. The weight of an application is equal to all seed devices' global weight plus all paths' auto weight.

Figure 25:
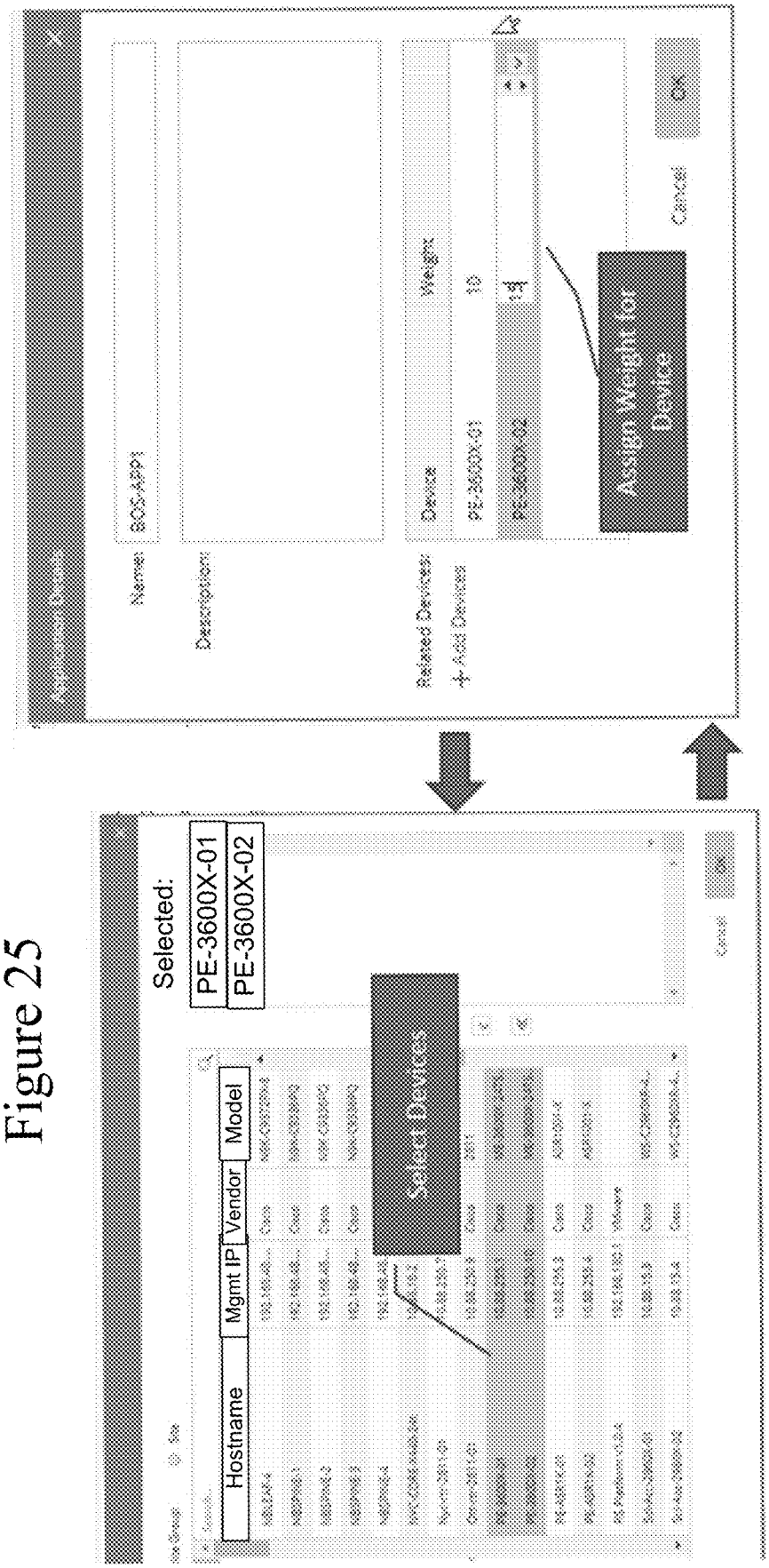
FIG. 25 is an example screenshot showing assignment of devices to an application and weight to a device.

FIG. 25 is an example screenshot showing assignment of weight to devices. A user can manually assign related devices to an application and assign a weight for each device. The user can select the devices and then assign weight for each of those devices. The weight determines an order in which application paths are displayed. In addition to assigning a device weight, there may be a path weight that is automatically assigned. Each device on a map that is on the path of an application increases the weight by 1. For example, if there are 3 devices (R1, R2 and R3) on a map, Path 1 of the App1 passes the three devices (from R1 to R3), Path2 of the APP2 passes two devices (R1 and R2), then the auto weight of App1 is 3 and the auto weight of App2 is 2. Because weight is application-level, the auto weight of an application is the sum of the weights of all the paths it contains after matching with devices on a map. For example, APP1 has two paths, the weight of Path1 is 3, the weight of Path2 is 5, then the auto weight of App1 is 3+5=8. When finding the path that a device belongs to, the system will first search it in the golden path and then look it up in the latest successful path if there is no golden path.

Figure 26:
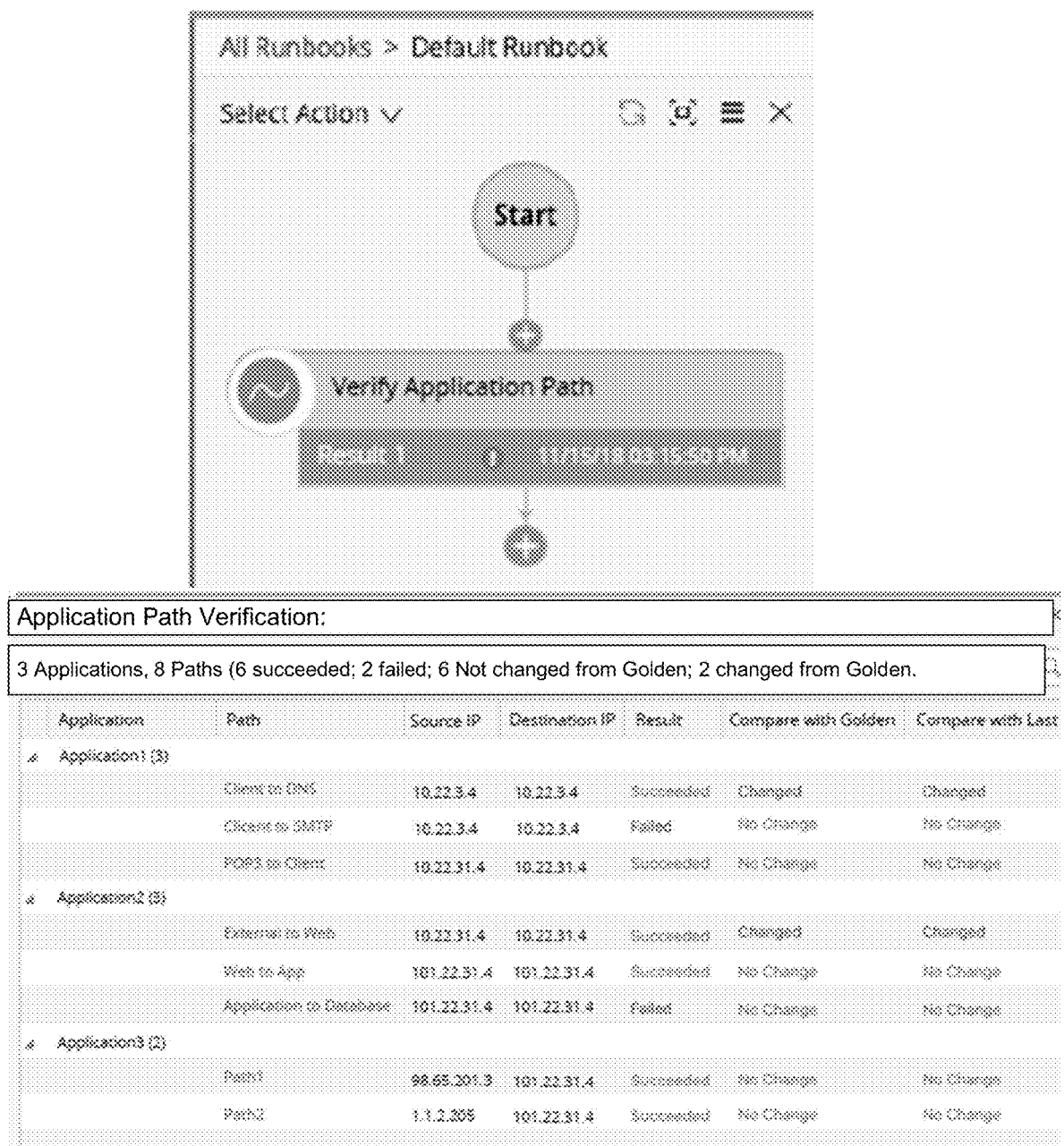
FIG. 26 is an example screenshot showing the execution of a verify application node with an application path verification pane.

FIG. 26 is an example screenshot showing the execution of a verify application node with an application path verification pane. After verifying the application paths in the Runbook, a user can view the verification results in the application path verification pane shown in FIG. 26. The pane to the left shows the verify application path that was run and the right side of the pane shows the application path verification that lists the results and the comparisons for each of the application paths.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for network management comprising:
   generating a map displaying network devices that includes multiple topology types including a virtual extensible local area network (VXLAN), a Layer 2 (L2), and a Layer 3 (L3);
   determining a topology dependence of the multiple topology types with each of the multiple topology types corresponding to one of a plurality path types;
   calculating paths between the devices, including a corresponding path and an underlay path through multiple topology types, wherein the calculating comprises determining one of the path types based on the topology dependence and the corresponding path shows how traffic flows through the network and establishes a compare point for a current state of the network;
   providing an interface for selecting path types for each of the network devices, wherein the interface includes a selection of one or more applications;
   selecting, automatically, paths between any two of the network devices when there is no selection of the path types at one of the network devices, wherein the selecting comprises a discovering based on the topology dependence;
   displaying one of the paths based on the selection of the path types at each of the network devices, wherein at least some of the paths are associated with the one or more applications;
   displaying the multiple topology types for the displayed path; and
   displaying, upon association of a particular application, the associated path for the particular application.

2. The method of claim 1, wherein the network being managed includes an overlay deployment using the VXLAN topology type.

3. The method of claim 1, wherein the topology dependence comprises the VXLAN topology type depending on the L3 topology type, and comprises the L3 topology type depending on the L2 topology2 type.

4. The method of claim 1, wherein the displayed one of the paths corresponds with the selected path type at each of the network devices.

5. The method of claim 1, wherein each of the path types for each of the network devices is selectable.

6. The method of claim 5, wherein the selection of different ones of the path types displays different paths and the selectable path types are displayed on a path result pane adjacent to the mapping.

7. The method of claim 1, wherein the topology dependence comprises a type of an outbound interface at each of the network devices, wherein the calculating includes determining which of the path types to calculate based on the topology type of the outbound interface.

8. The method of claim 1, wherein the displaying is further comprising:
defining the one or more applications;
associating at least some of the paths with the defined one or more applications;
receiving a selection of one of the one or more applications; and
displaying the path associated with the selected application.

9. The method of claim 8, wherein the associating comprises identifying which paths that data travels for the defined application.

10. The method of claim 1, further comprising:
recording the topology dependence between different paths.

11. The method of claim 1, further comprising:
monitoring changes of actual traffic as compared with the calculated corresponding path as the compare point for the current state of the network.

12. A method for network management comprising:
determining a golden path for traffic flow through a network, wherein the golden path comprises how traffic flows through the network and establishes a compare point for a current state of the network;
monitoring traffic through the network;
comparing the monitored traffic with the golden path for the traffic flow;
detecting, automatically based on the monitoring and comparing, any changes of the monitored traffic compared with the golden path;
updating, automatically based on the monitoring, the golden path based on the detected changes;
displaying the golden path on a map, wherein the displaying includes dynamically displaying the updating of the golden path on the map automatically during the updating; and
displaying one or more paths on the map along with the golden path as it is automatically updated upon the detected changes in order to show differences between the one or more paths and the golden path, wherein the one or more paths comprise current and historical paths.

13. The method of claim 12, wherein the display on the map of the golden path is automatically updated as the traffic is monitored.

14. The method of claim 12, wherein the one or more paths comprises both an underlay path and an overlay path.

15. The method of claim 12, wherein the updating the golden path requires a number of benchmark paths to be successful before the changing of the path for the golden path.

16. The method of claim 15, wherein the number of benchmark paths is set by the user.

17. A system comprising:
a processor;
a memory configured to store configured to store code executable by the processor; and
a graphical user interface displayed via execution by the processor, the graphical user interface comprising:
a map displaying network devices and paths between each of the network devices, wherein the paths include both an underlay path and an overlay path discovered automatically based on a topology type, which includes a virtual extensible local area network (VXLAN), a Layer 2 (L2), and a Layer 3 (L3), further wherein the overlay path comprises the VXLAN topology type, wherein the paths include a calculated path showing how traffic flows through the network and establishes a compare point for a current network state;
a path result pane displayed adjacent the map and displaying the network devices and the path types along with the outbound interface for each, wherein the path result pane is configured to display a selection of one of the path types, wherein the selection is automatically discovered based on a topology dependence or is received from a user through the path result pane and the selection results in a display of paths from that path type that includes each of the topology types for the selected path type, wherein the topology dependence has each of the topology types corresponding to one of a plurality path types; and
an application manager for defining a plurality of applications and for associating at least one path in which data travels for each of the defined applications.

18. The system of claim 17, wherein a network displayed on the map includes an overlay deployment using the VXLAN topology type.

19. The system of claim 17, wherein the calculated path comprises a golden path that is automatically updated.

20. The system of claim 17, wherein the application manager further includes selecting an application from the plurality of applications and displaying on the map, upon the selecting, each of the at least one path associated with that application.

* * * * *